(12) United States Patent  
Pierson et al.

(10) Patent No.: US 11,478,332 B2  
(45) Date of Patent: Oct. 25, 2022

(54) DENTAL MATERIAL DELIVERY SYSTEM

(71) Applicant: Dentsply Sirona Inc., York, PA (US)

(72) Inventors: Paul R Pierson, Camden, DE (US); Christoph Weber, Constance (DE); Peter Max Coveleski, Lewes, DE (US); Kenneth R Guaragno, Spring Grove, PA (US); Naim Karazivan, Quebec (CA); James Sirkis, Milford, DE (US)

(73) Assignee: DENTSPLY SIRONA INC., York, PA (US)

( * ) Notice: Subject to any disclaimer, the term of this patent is extended or adjusted under 35 U.S.C. 154(b) by 316 days.

(21) Appl. No.: 15/546,769

(22) PCT Filed: Mar. 7, 2016

(86) PCT No.: PCT/US2016/021177  
§ 371 (c)(1),  
(2) Date: Jul. 27, 2017

(87) PCT Pub. No.: WO2016/144868  
PCT Pub. Date: Sep. 15, 2016

(65) Prior Publication Data  
US 2018/0000561 A1 Jan. 4, 2018

Related U.S. Application Data

(60) Provisional application No. 62/129,082, filed on Mar. 6, 2015.

(51) Int. Cl.  
*A61C 5/68* (2017.01)  
*A61C 5/62* (2017.01)  
(Continued)

(52) U.S. Cl.  
CPC .............. *A61C 5/68* (2017.02); *A61C 1/0015* (2013.01); *A61C 5/60* (2017.02); *A61C 5/62* (2017.02); *A61C 5/66* (2017.02)

(58) Field of Classification Search  
CPC .... A61C 5/60; A61C 5/62; A61C 5/66; A61C 5/68; A61C 5/64; B01F 7/0005;  
(Continued)

(56) References Cited

U.S. PATENT DOCUMENTS 2,578,180 A * 12/1951 Edwards ............... B22C 5/0472  
                                                             241/284  
3,204,283 A * 9/1965 Damron ................. B65D 51/32  
                                                             401/4  
(Continued)

FOREIGN PATENT DOCUMENTS

EP        1736113 A1    12/2006  
JP      2004016707 A     1/2004  
(Continued)

OTHER PUBLICATIONS

International Search Report; PCT/US2016/021177; Jul. 7, 2016 (completed); dated Jul. 29, 2016.  
(Continued)

*Primary Examiner* — Yogesh P Patel  
(74) *Attorney, Agent, or Firm* — Dentsply Sirona Inc.

(57) ABSTRACT

Described herein is a dental material applicator system comprising a segmented capsule and handpiece. The capsule separately holds a powder and a liquid such that upon activation in the handpiece by an operator, the powder and liquid are mixed into a paste. The operator then triggers the handpiece so that the mixed paste is extruded.

9 Claims, 23 Drawing Sheets

(51) Int. Cl.
*A61C 5/66* (2017.01)
*A61C 5/60* (2017.01)
*A61C 1/00* (2006.01)

(58) Field of Classification Search
CPC .............. B01F 7/0058; B01F 15/00941; B01F 7/00075; B01F 7/00083; B01F 7/00125; B01F 7/00141; B44D 3/08
See application file for complete search history.

(56) References Cited

U.S. PATENT DOCUMENTS

| | | | | |
|---|---|---|---|---|
| 3,389,468 | A * | 6/1968 | Lewis | A61C 17/005 |
| | | | | 433/80 |
| 3,559,961 | A | 2/1971 | Bergendal | |
| 3,655,035 | A * | 4/1972 | Muhlbauer | A61C 5/66 |
| | | | | 206/219 |
| 3,715,806 | A | 2/1973 | McNickle | |
| 3,724,077 | A | 4/1973 | Preston | |
| 3,792,530 | A | 2/1974 | Smith | |
| 4,138,816 | A | 2/1979 | Warden | |
| 4,322,022 | A * | 3/1982 | Bergman | B05C 17/0103 |
| | | | | 222/327 |
| 5,620,423 | A | 4/1997 | Eykmann | |
| 7,326,282 | B2 * | 2/2008 | Cattani | A61C 17/04 |
| | | | | 96/156 |
| 2003/0040141 | A1 * | 2/2003 | Crane | B65D 81/32 |
| | | | | 438/118 |
| 2004/0045982 | A1 | 3/2004 | Herman | |
| 2005/0048437 | A1 * | 3/2005 | Kamohara | B01F 7/008 |
| | | | | 433/89 |
| 2006/0227653 | A1 | 10/2006 | Keller | |
| 2006/0270036 | A1 * | 11/2006 | Goodwin | B01F 13/0255 |
| | | | | 435/395 |
| 2007/0251839 | A1 | 11/2007 | Jessop | |
| 2010/0233646 | A1 * | 9/2010 | Brokx | A61C 5/62 |
| | | | | 433/36 |
| 2012/0265209 | A1 | 10/2012 | Druma | |
| 2012/0295221 | A1 * | 11/2012 | Cheetham | A61C 5/64 |
| | | | | 433/90 |
| 2014/0305816 | A1 * | 10/2014 | Cheetham | A61C 5/66 |
| | | | | 206/219 |
| 2015/0010882 | A1 * | 1/2015 | Bergheim | A61C 1/087 |
| | | | | 433/80 |

FOREIGN PATENT DOCUMENTS

| | | |
|---|---|---|
| WO | 20110025737 A1 | 3/2011 |
| WO | 2011100852 A1 | 8/2011 |

OTHER PUBLICATIONS

International Preliminary Report on Patentability; PCT/US2016021177; Jul. 7, 2016 (completed); dated Jul. 29, 2016.
Written Opinion of the International Searching Authority; PCT/US2016021177; Jul. 7, 2016 (completed); dated Jul. 29, 2016.

* cited by examiner

SECTION A-A

SECTION B-B

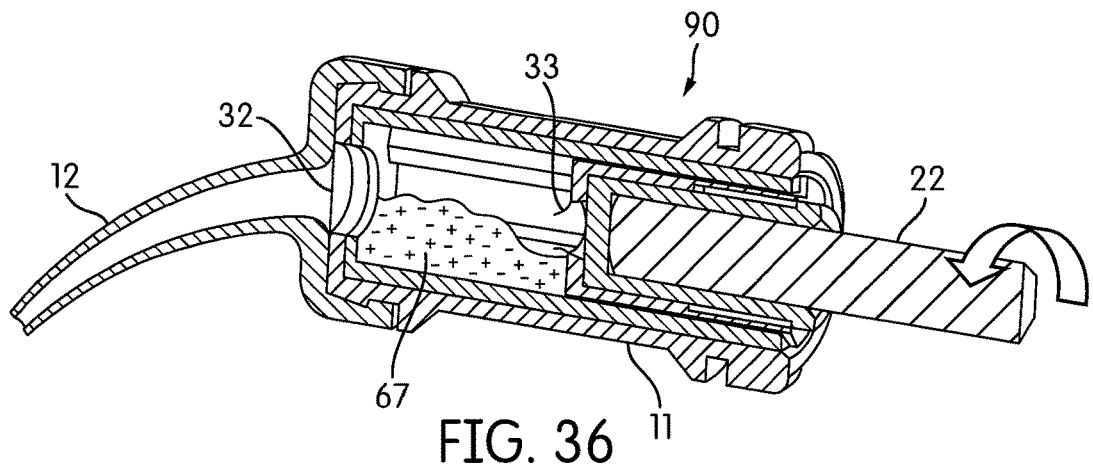
FIG. 36
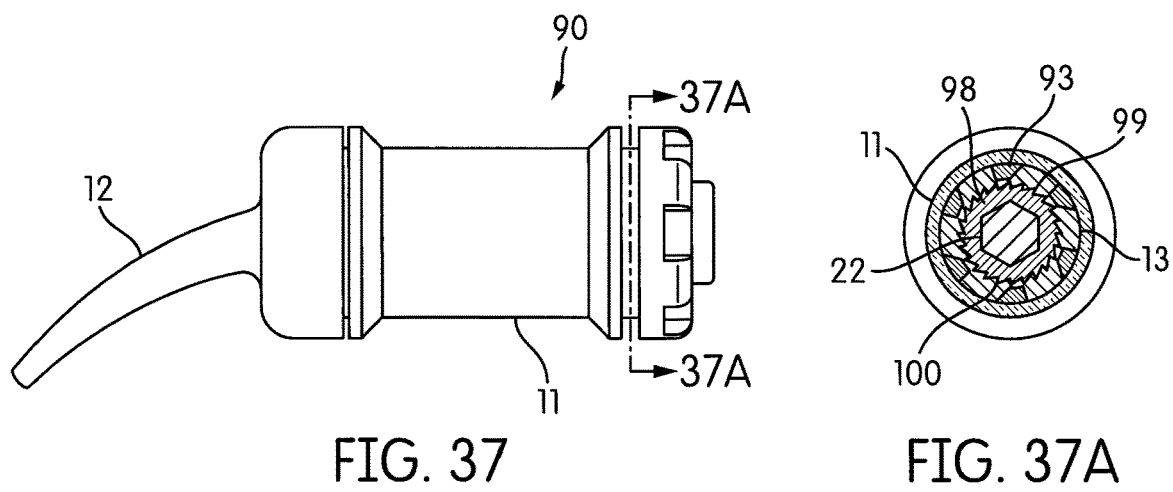
FIG. 37
FIG. 37A
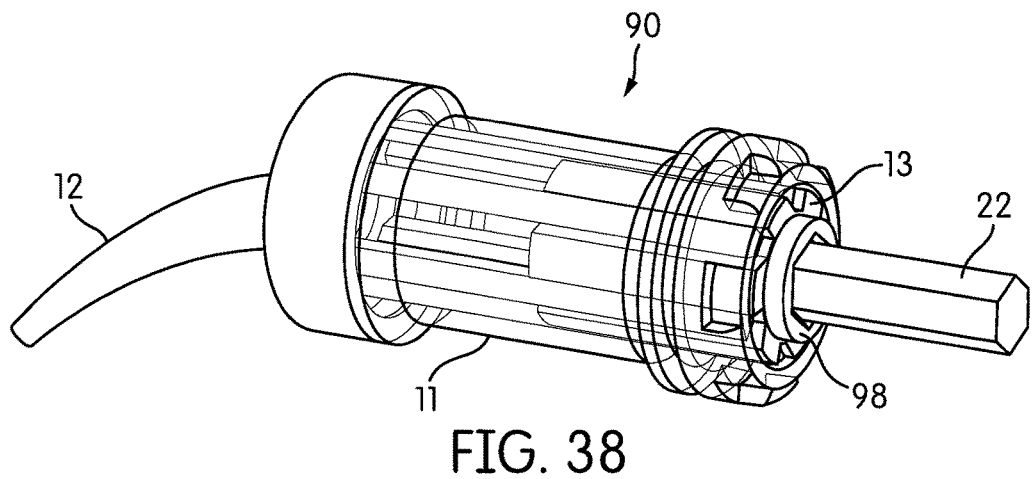
FIG. 38

DENTAL MATERIAL DELIVERY SYSTEM

BACKGROUND

The process known in the prior art including activation of the capsule, transferring the capsule to the amalgam mixer, mixing the capsule, removing the capsule from the amalgam mixer and loading the capsule into a human powered dispensing device is laborious and time consuming and sometimes requires the help of a dental assistant. In some cases, the user requires up to three separate pieces of equipment to carry out this procedure. It is therefore the intent of the present invention, to combine these steps into an easy to use handpiece and capsule system that performs each of these functions and eliminates the need to transfer the capsule to individual devices for activation, mixing and dispensing.

SUMMARY

Described herein is an automatic powder/liquid capsule and applicator, collectively referred to as a delivery system, intended to replace the traditional amalgam mixer and powder/liquid dental capsules for mixing and dispensing powder/liquid dental materials such as cements and restoratives. The delivery system consists of a new capsule and handpiece that are used in combination to activate, mix and apply the material contained in the capsule without the laborious need to transfer a capsule between several devices to accomplish the same result.

BRIEF DESCRIPTION OF THE DRAWINGS

FIG. 36 shows a cross section of the capsule of FIG. 30 with the hex drive rotating to mix the powder and liquid components.

FIG. 37 illustrates a side view and cross section of the activated capsule as in FIG. 30.

FIG. 38 shows an activated capsule as in FIG. 30.

Figure 1:
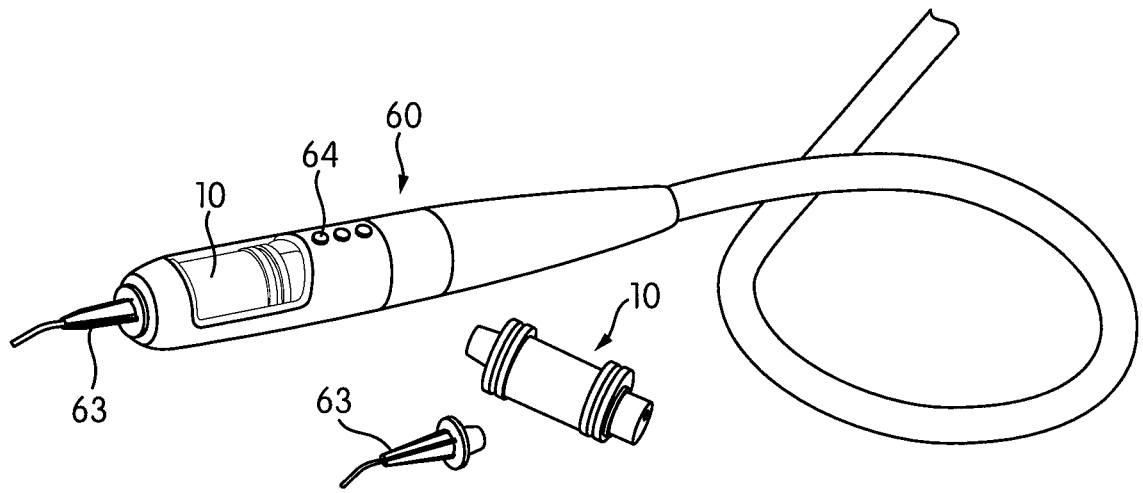
FIG. 1 shows a conceptual rendering of such a handpiece and capsule with an offset axis.

NUMBERING AND NOMENCLATURE 10 capsule
11 body
12 nozzle
13 liquid cup
14 plunger
15 plunger driver
16 planet gear
17 hexagonal drive hole
18 post
20 Planetary mixing capsule
21 ring gear
22 hexagonal drive shaft
23 flange
30 main axis of rotation
31 offset axis
32 second frangible membrane
33 first frangible membrane
34 axis of hexagonal drive hole
35 post axis
40 liquid compartment
50 mixing compartment
51 handpiece bearings
52 main geared drive shaft
53 secondary geared drive shaft
54 eccentric gear interface
55 planetary capsule chamber
56 geared eccentric flange
60 handpiece
61 circular exterior flanges
62 chamber
63 dispensing tip
64 control button
65 liquid
66 powder
67 Paste
70 capsule with internal mixing blades
71 primary perforated disc
72 secondary perforated disc
73 capsule drive shaft
74 Cut out
75 stop block
76 perforations
77 liquid sealing disk
78 ledge
79 wiper flange
80 end cap
81 channel
81 retaining groove
83 connector
84 donut-shaped liquid cup
85 donut-shaped plunger
86 propeller-shaped mixing blade
87 outer ring
88 radial member
90 capsule with rotary mixing blades
91 rotary mixing blades
92 round support disc
93 radially spaced blades
94 passage hole
95 acute angle edge
96 obtuse angle edge
97 radially spaced grooves
98 plug
99 first ratchet teeth
100 second ratchet teeth
112 distal end of sonotrode
113 sonotrode
114 vibration source
115 counter weight
116 sliding sleeve
117 outer body of handpiece
118 spring
119 ultrasonic handpiece
120 vibrations
130 capsule with loose magnetic mixing elements
131 external magnetic field
132 loose magnetic mixing elements
400 capsule with liquid storage in the mixing shaft
409 bayonet locking thread
410 liquid storage compartment
411 powder
412 liquid
413 hollow shaft
414 frangible membrane
415 handpiece drive shaft
416 solid end face
417 open end
418 dental composition
419 bayonet locking tabs
421 capsule body
441 mixing disc
442 angled perforation
444 donut-shaped plunger
446 nozzle
447 extrusion tube
448 vent hole
450 Mixing compartment
451 first displaceable piston
452 second displaceable piston
460 handpiece for capsule with liquid storage in mixing shaft
465 elongated plunger

DETAILED DESCRIPTION

Figure 10:
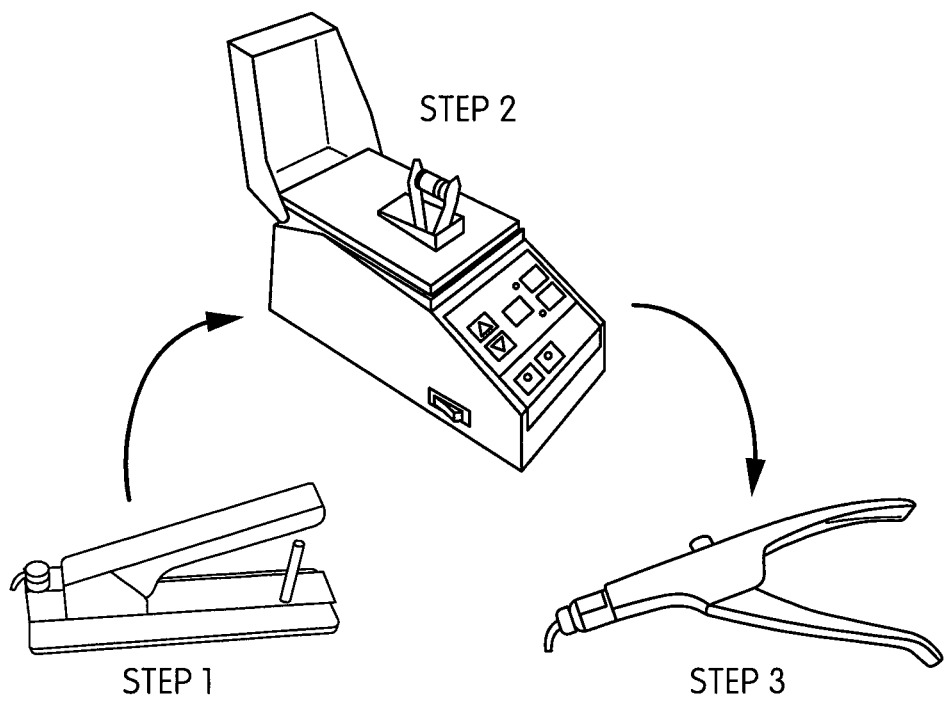
FIG. 10 shows the process known in the prior art.
Figure 11:
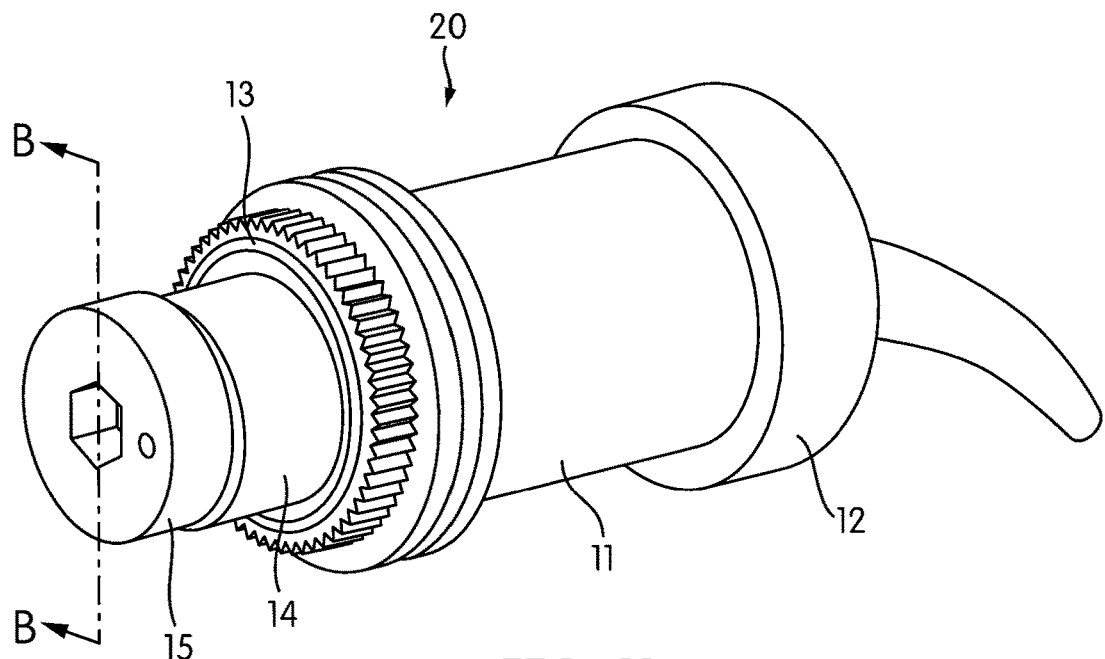
FIG. 11 illustrates a second embodiment of a powder/liquid capsule for producing planetary mixing motion.
Figure 12:
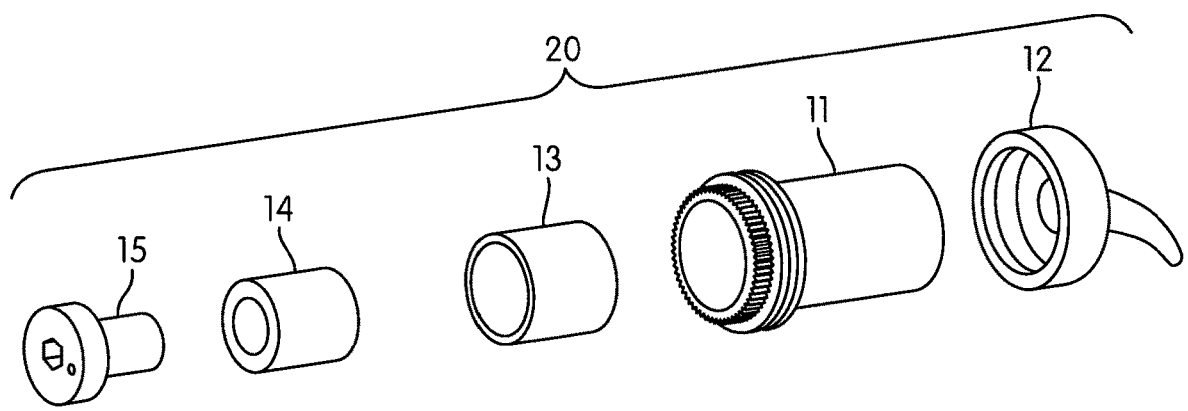
FIG. 12 illustrates an exploded view of the capsule of FIG. 11.
Figure 13:
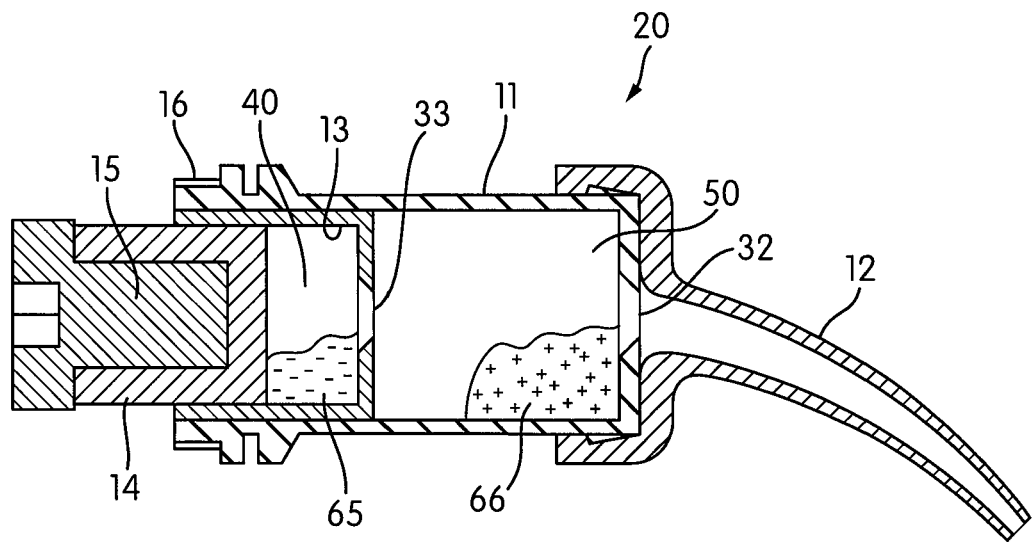
FIG. 13 illustrates a cross section of the capsule of FIG. 11.
Figure 14:
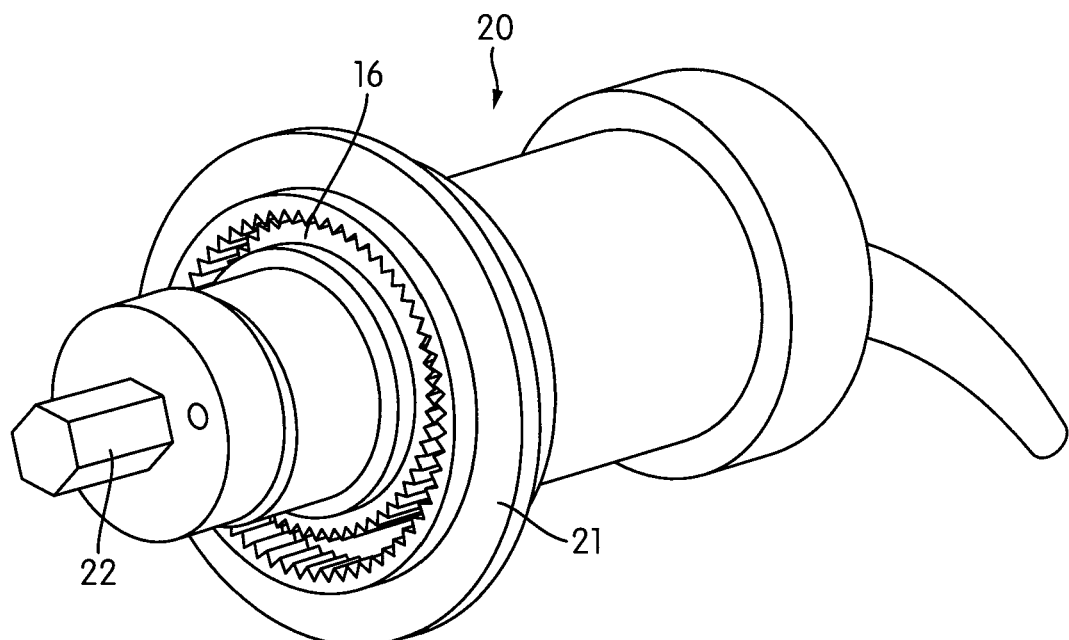
FIG. 14 illustrates the capsule of FIG. 11 engaged with the hex drive and ring gear of the dispenser.
Figure 15:
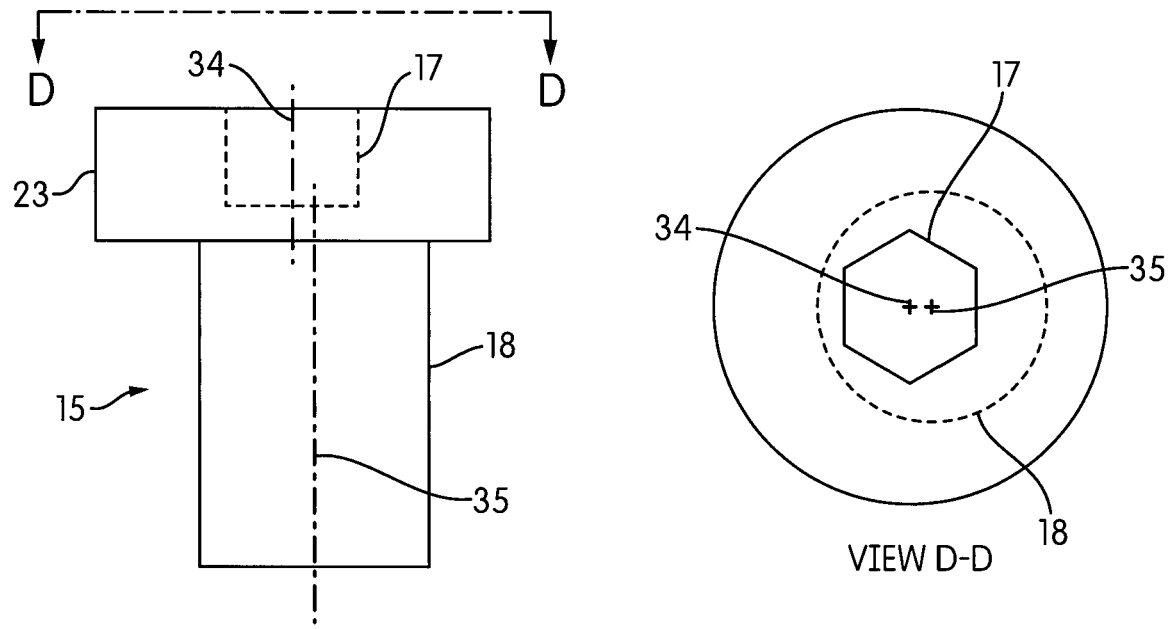
FIG. 15 illustrates a side view and an end view of the plunger driver of FIG. 11 and the eccentric axis of the post.
Figure 16:
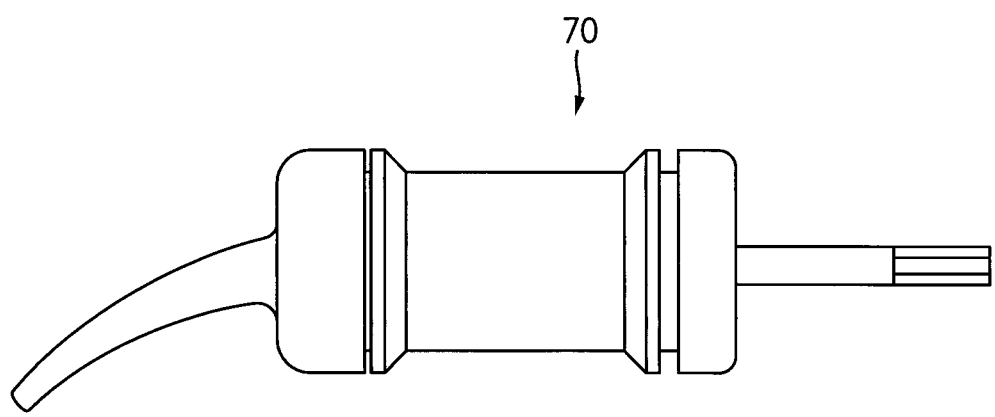
FIG. 16 illustrates a side view of a capsule in another embodiment in the filled/ready to activate stage, wherein internal mixing elements rotate and reciprocate.
Figure 17:
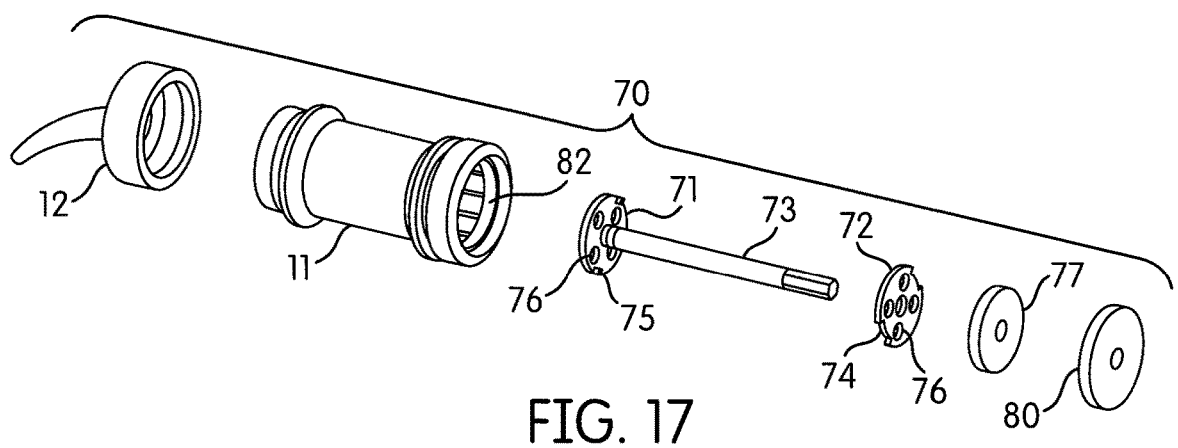
FIG. 17 shows an exploded view of the capsule components of FIG. 16.

As shown in FIG. 10, the process known in the prior art including activation of the capsule, transferring the capsule to the amalgam mixer, mixing the capsule, removing the capsule from the amalgam mixer and loading the capsule into a human powered dispensing device is laborious and time consuming and sometimes requires the help of a dental assistant. In some cases, the user requires up to three separate pieces of equipment to carry out this procedure. It is therefore the intent of the present invention, to combine these steps into an easy to use handpiece and capsule system that performs each of these functions and eliminates the need to transfer the capsule to individual devices for activation, mixing and dispensing.

Figure 2:
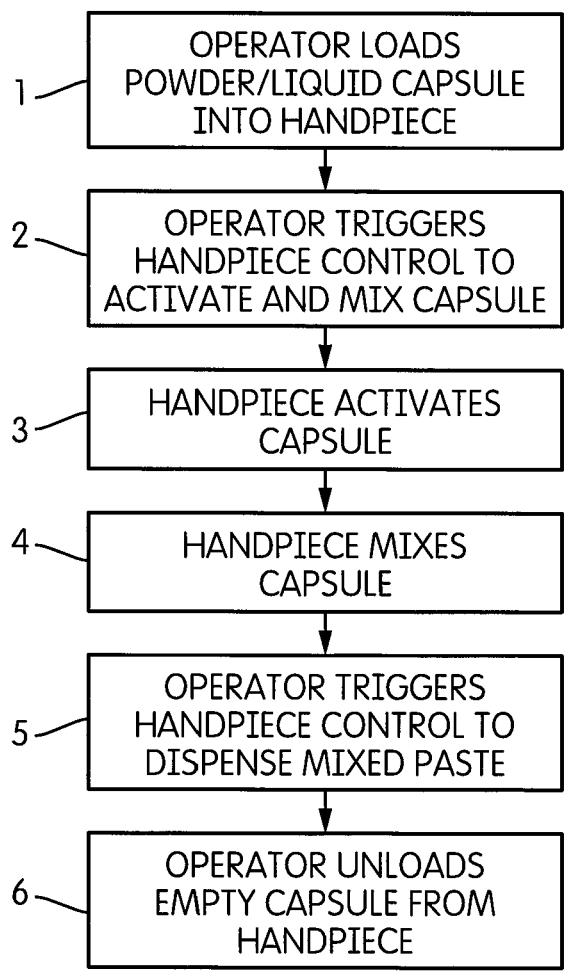
FIG. 2 outlines the functional aspects described herein.

The diagram of FIG. 1 is a conceptual rendering of such a device and capsule, while the block diagram of FIG. 2 outlines the functional aspects described herein. There are numerous methods by which the device activates and mixes the capsule (block diagram steps 3 and 4) some of which are outlined here.

The applicator disclosed herein includes a capsule having three main components: a capsule body, a liquid cup, and a plunger. The capsule may be pre-loaded with liquid and powder components for the desired dental product. The capsule may also have an integral dispensing nozzle, which acts as a conduit through which the mixed paste is delivered and for extending the reach of the device. If an integral nozzle is not used a separate dispensing tip 63 may be used, which would include a mechanism for attaching the tip to the capsule.

The applicator system disclosed herein includes a handpiece having a variety of electro mechanical components including power sources such as a battery, capacitor, chair-side dental unit resources or other such power sources, a mechanism for mixing the capsule, a mechanism for incrementally advancing the drive shaft, a capsule compartment for loading and unloading the capsule, an opening for loading and unloading the capsule and control buttons or similar operator interface controls to operate the handpiece.

The handpiece may use energy sources typically available on a dental chair resource center such as compressed air, electricity, water, etc. Conceivably, function/control buttons 64 on the handpiece initiate programmed sequences as follows:

(1) Load/Unload—Locks the handpiece compartment door and advances the drive shaft to engage with the capsule plunger (FIG. 2, step 1) or when unloading, retracts the drive shaft and unlocks the handpiece compartment door for removal of a used capsule (FIG. 2, step 6).

(2) Mix—Upon Operator demand (FIG. 2, step 2), the capsule is activated by advancing the drive shaft, which displaces the liquid into the powder/mixing compartment (FIG. 2 step 3), the drive shaft stops advancing and then starts to rotate rapidly to mix the powder/liquid components (FIG. 2, step 4). A pre-programmed mixing algorithm is initiated which controls mixing speed, direction, and duration specific to the material being mixed. The mixing motion then stops after the desired paste consistency is achieved.

(3) Apply—When pressed by the user, advances the drive shaft to move the liquid compartment/plunger forward to dispense the paste and stops dispensing when released (FIG. 2, Step 5).

Figure 54:
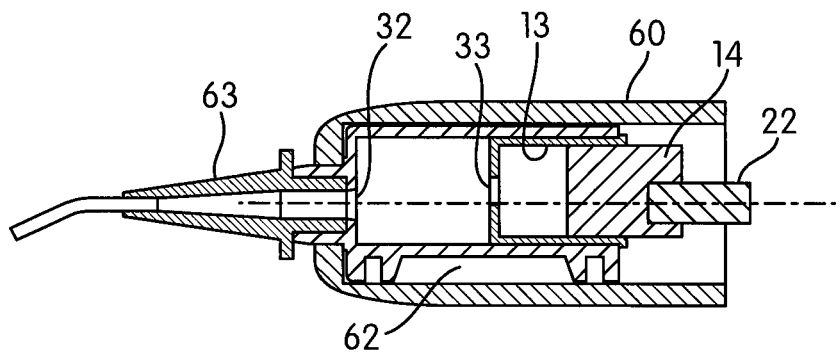
FIG. 54 shows a partial cross section of the handpiece of FIG. 1 and offset axis capsule of FIG. 55.
Figure 55:
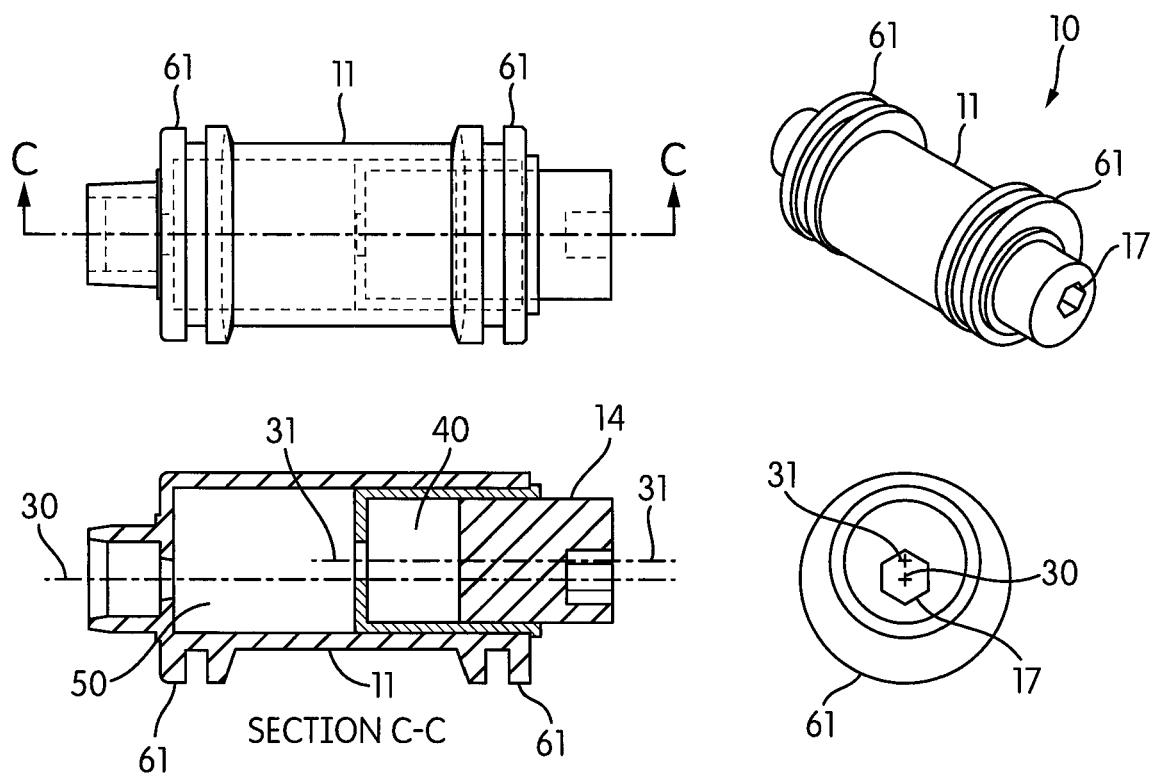
FIG. 55 shows a cross section of a handpiece and capsule in another embodiment with an offset axis.

The following embodiments refer to FIGS. 1, 54 and 55 and are referred herein as a rotating capsule with offset axis.

One embodiment disclosed herein is a capsule that has a mixing compartment on an off-center axis. The capsule is then spun on a main axis which is offset from the mixing compartment axis.

As shown in FIGS. 54 and 55, the off-center capsule has two compartments, one mixing compartment 50 which is prefilled with powder and another liquid compartment 40 for isolating the liquid during storage and transport. In the present disclosure, the two compartments are on an offset axis 31 from the main axis 30, so that when the capsule is rapidly spun along the main axis 30, the materials are subjected to centrifugal forces, causing them to thoroughly intermix. In addition, because of the relatively low mass of the handpiece and the rapid rotation of the capsule, the handpiece will vibrate due to the offset mass of the capsule, which also contributes to the mixing action.

The liquid compartment 40 has a plunger 14 that is coaxial to the liquid compartment 40. The plunger has a hexagonal drive hole 17 in the distal end for receiving the hexagonal drive shaft 22. The hexagonal drive hole 17 and hexagonal drive shaft 22 are positioned along the main axis of rotation 30. The axis of the liquid compartment 40 and mixing compartment 50 are offset from the main axis of rotation 30 (FIG. 55). The hexagonal drive shaft 22 is configured to engage the hexagonal drive hole 17 (FIG. 54). During activation, the plunger 14 is pushed forward by the hexagonal drive shaft 22, hydraulic force ruptures a first frangible membrane 33 on the liquid cup 13. The liquid is then displaced into the mixing compartment 50 by the forward advancing plunger 14. The drive shaft stops advancing once the plunger reaches the distal end of the liquid compartment 40 completing the delivery of liquid into the mixing compartment 50. This process of bringing the liquid into the mixing compartment 50 is called activation (FIG. 2, step 3)

The capsule body has circular exterior flanges 61 that are concentric with the main axis of rotation 30. The flange axis is coincidental to the main axis of rotation 30 and is offset from the axis of the mixing compartment 50. The handpiece 60 has a chamber 62 that is configured for receiving capsule 10 in which capsule 10 can freely rotate (FIG. 54).

After activation, mixing is automatically initiated (FIG. 2, step 4) and the hexagonal drive shaft 22 begins to rotate rapidly, spinning the capsule about the main axis of rotation 30. Because the mixing compartment is offset from the main axis of rotation, the powder and liquid components are subjected to centrifugal forces causing them to intermix. The handpiece 60 rotates the capsule 10 for a predefined amount of time, speed and direction, specific to the needs of the material being mixed. Ideally, such mixing would take about 10 to 15 seconds.

After mixing, the user initiates dispensing (FIG. 2, step 5), by attaching a separate dispensing tip 63 (if the capsule is not equipped with a built-in dispensing nozzle) and then by moving the hexagonal drive shaft 22 forward by pressing a control button 64 or a footswitch. The hexagonal drive shaft 22 moves forward and causes a second frangible membrane 32 on the distal end of the mixing compartment 50 to rupture due to hydraulic forces. The mixed paste is then displaced through the separate dispensing tip 63 by the forward advancing liquid cup 13 and plunger 14, which now move in unison. In another embodiment, the user has ultimate control of the application and can dispense as much or as little paste as needed by use of a control button 64 or foot switch.

The following embodiments refer to FIGS. 3-9 and 11-15 and are referred herein as a planetary mixing capsule. The handpiece 60 is not shown for purposes of clarity, however, some functional aspects and mechanical features of handpiece 60 are described herein to provide context for the mechanical interaction of the handpiece 60 upon planetary mixing capsule 20

Another embodiment disclosed herein, is a planetary mixing capsule 20 contained within a planetary capsule chamber 55 of handpiece 60 that rotates while simultaneously orbiting an eccentric axis. The planetary motion can be produced entirely by the handpiece or through a combination of capsule and handpiece features. In various embodiments, a planetary mixing capsule 20 as depicted in FIGS. 3-9 and 11-15 may be used in the delivery system described herein.

The planetary embodiments overcome an inherent problem in the offset capsule embodiments, which is that uniform centrifugal force of the offset embodiment keeps the paste in the same spot throughout the mixing. The planetary embodiment overcomes this by rotating the capsule about its own axis while it also rotates about an eccentric axis.

The planetary capsule 20 configuration creates a motion that is similar to a planet that orbits the sun, where the planet follows an orbit around the sun (central main axis of rotation 30) and also rotates on its own axis (the eccentric offset axis 31). The direction of rotation can be in either direction or oscillate back and forth. Thus, a variety of mixing actions may be performed.

The main axis of rotation 30 is coincident with the main geared drive shaft 52 of handpiece 60. The main geared drive shaft 52 spins the capsule 20 (planet) while the secondary geared drive shaft 53 of handpiece 60, spins the handpiece planetary capsule chamber 55 (orbit).

Figure 3:
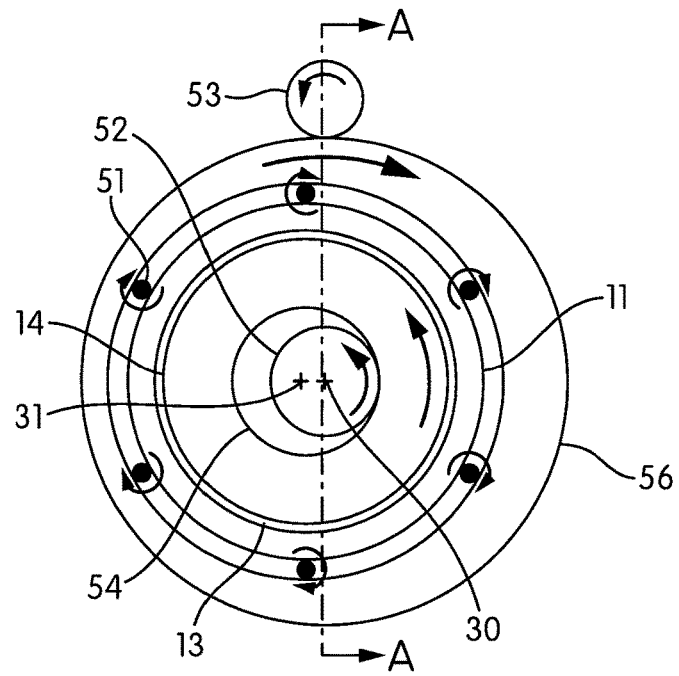
FIG. 3 shows one embodiment of a planetary mixing capsule wherein the handpiece establishes an orbit by rotating the capsule chamber and wherein the drive shafts, bearings and capsule chamber are part of the handpiece
Figure 4:
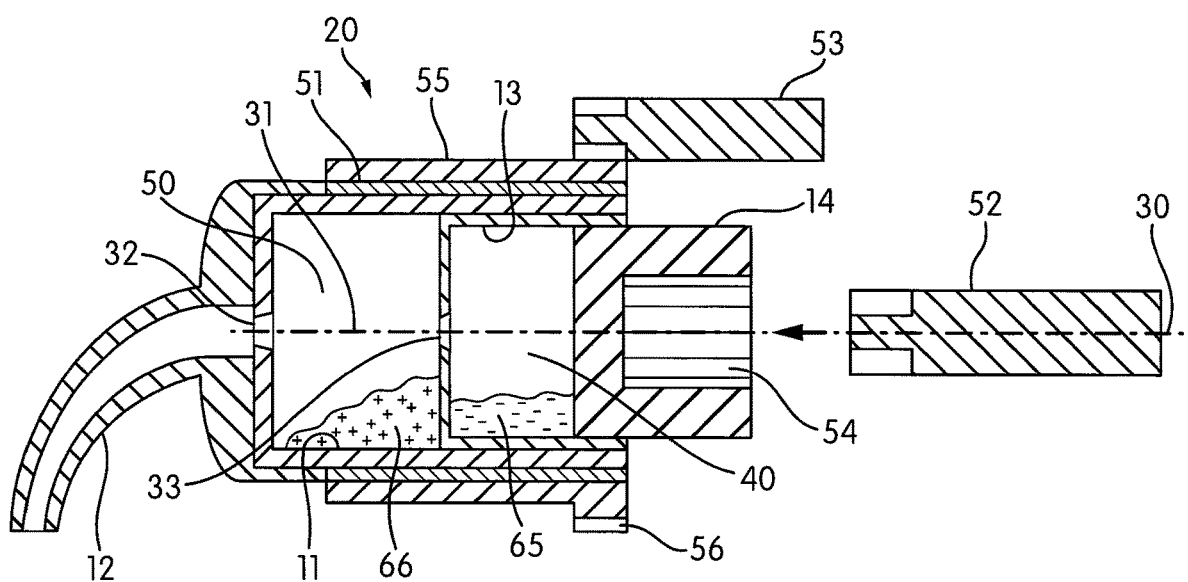
FIG. 4 is a cross section of the embodiment shown in FIG. 3 wherein the capsule and handpiece mechanisms are in the pre-activation stage.
Figure 5:
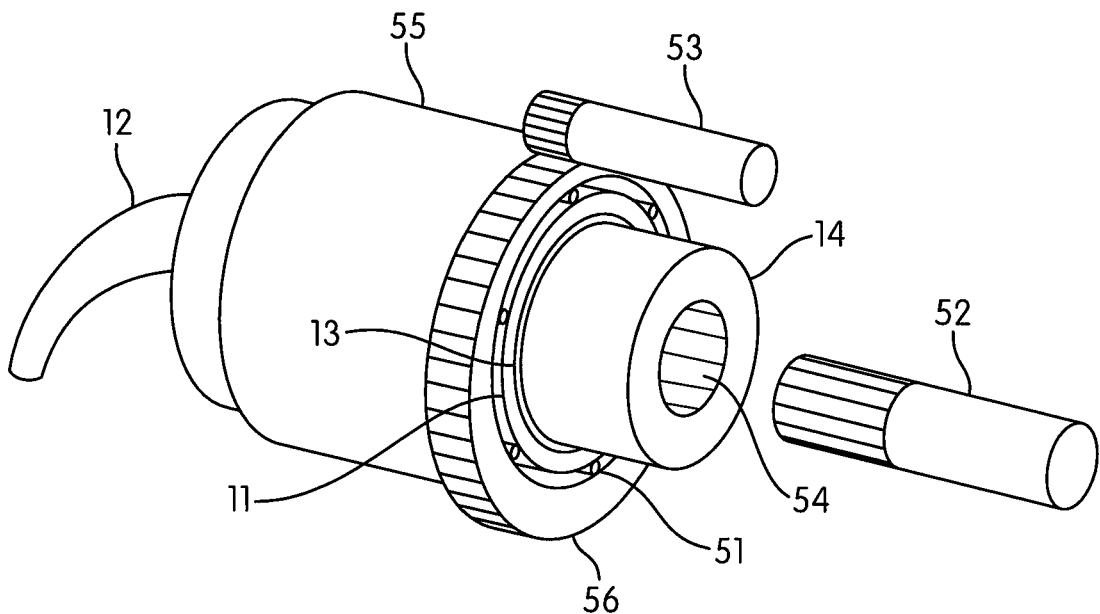
FIG. 5 is an isometric view in the same configuration as shown in FIG. 4.

As demonstrated in FIG. 3, the handpiece 60 establishes an orbit by rotating the capsule chamber 55, which is not to be confused with the mixing compartment 50, the capsule chamber 55 is a compartment within the handpiece 60 which contains the planetary mixing capsule 20. The capsule chamber 55 has an eccentric cavity. A secondary geared drive shaft 53 engages a geared eccentric flange 56 of the planetary capsule chamber 55.

Figure 6:
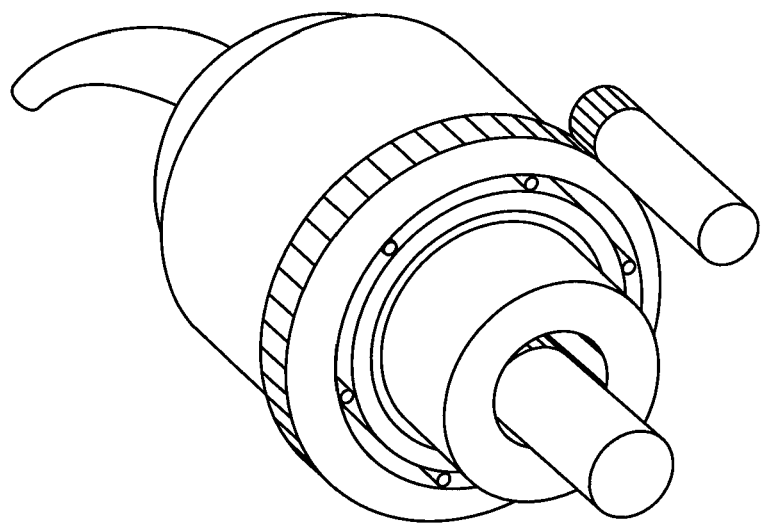
FIG. 6 shows the main drive shaft of FIG. 4 after it has advanced into the plunger which contains a mating eccentric gear interface.
Figure 7:
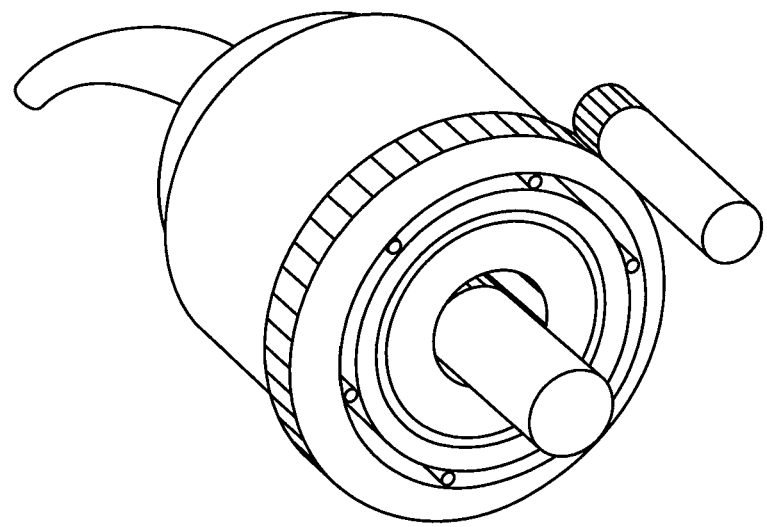
FIG. 7 shows the assembly of FIG. 4 after activation.

First, the main geared drive shaft 52 advances to engage an eccentric gear interface 54 on the inner surface of the plunger 14 as shown in FIG. 6. Then the main geared drive shaft 52 advances again, on command, to activate planetary mixing capsule 20, displacing the liquid 65 into the powder 66 which is contained in mixing compartment 50 as shown in FIG. 7. During activation a first frangible membrane 33 on the distal end of liquid cup 13 ruptures due to hydraulic pressure caused by the advancing plunger.

Figure 8:
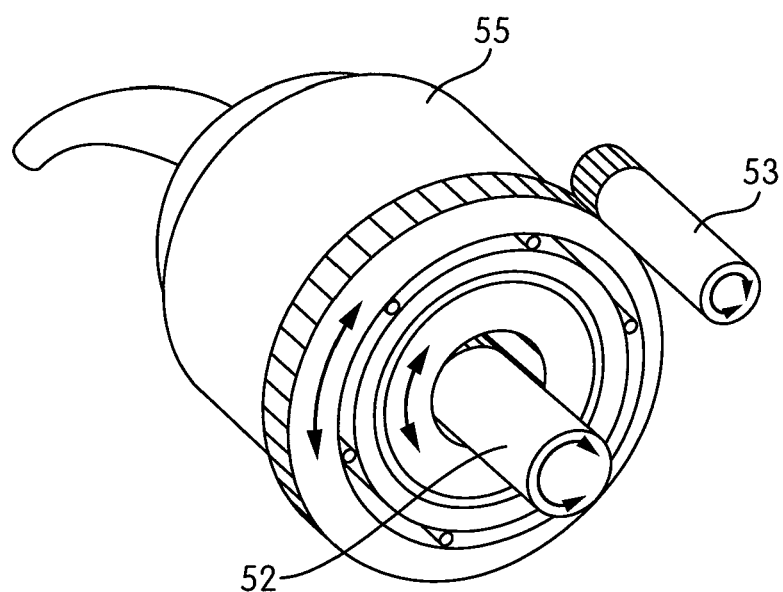
FIG. 8 shows the assembly of FIG. 4 where both drive shafts are rotating to produce the planetary motion.
Figure 9:
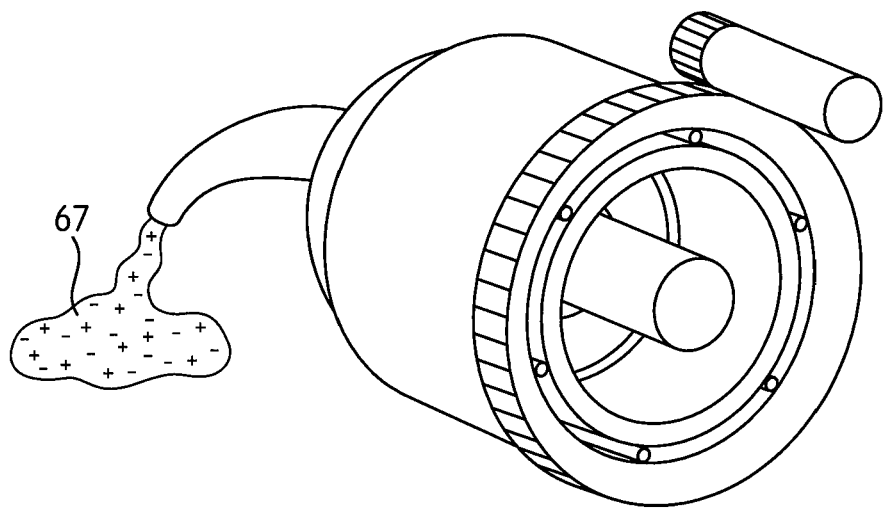
FIG. 9 shows the assembly of FIG. 4 in the dispensed state.

Mixing then automatically starts as both drive shafts 52 and 53 start to rotate as shown in FIG. 8. The secondary geared drive shaft 53 causes the eccentric offset axis 31 of planetary capsule chamber 55 to orbit the main axis of rotation 30. The main geared drive shaft 52 spins the mixing compartment 50 as it rotates about the orbit.

Another embodiment of the planetary mixing capsule 20 is represented in FIGS. 11-15, handpiece 60 is not described except for the ring gear 21 and hexagonal drive shaft 22 (FIG. 14), which are components of handpiece 60 and interface with planetary capsule 20.

The planet gear 16 on planetary capsule 20 interfaces with ring gear 21 on handpiece 60 to produce the desired planetary motion. Mixing is achieved through centrifugal forces and residual vibrations of the mechanism during operation. Ring gear 21 of handpiece 60 may remain stationary.

Planetary capsule 20 consists of a body 11, nozzle 12, liquid cup 13, plunger 14 and plunger driver 15. The powder 66 is contained in a distal section of the body 11 referred to as the mixing compartment 50. A second frangible membrane 32 separates the mixing compartment 50 from the nozzle 12. The liquid cup 13 seals the proximal end of the capsule body 11, thereby containing the powder 66 in the mixing compartment 50. The liquid 65 is contained in the liquid cup 13, which has a first frangible membrane 33 on the distal end. The proximal end of the liquid cup 13 is sealed by a frictional fit plunger 14. The proximal end of the plunger 14 has a cylindrical hole that mates with a post 18 on the distal end of the plunger driver 15. The post 18 fits loosely within the cylindrical hole of the plunger 14 so that it can rotate freely. The proximal end of the plunger driver 15 has a flange 23 with a hex-shaped hole 17 configured to mate with a hexagonal drive shaft 22 of the handpiece 60. The axis of the hexagonal drive hole 34 and the axis of the post 18 are offset and parallel. The axis of the hexagonal drive hole 34 is coincident with the main axis of rotation 30 and the ring gear 21 of the handpiece 60. The axis of the post 35 is coincident with the axis of the capsule body 11, liquid cup 13 and plunger 14.

The hexagonal drive shaft 22 of the handpiece engages with the hexagonal drive hole 17 of the plunger driver 15. The offset axis of the post 18 causes the planet gear 16 of the capsule body 11 to engage with the ring gear 21 of the handpiece. When the hexagonal drive shaft 22 turns it causes the post 18 to orbit around the main axis of rotation 30, thereby causing the planet gear 16 to orbit around the ring gear 21. The resulting motion causes the capsule body 11 to simultaneously orbit around the ring gear 21 and turn on the post axis 35.

The teeth of the gears 16 and 21 are arranged so that they mesh together and rotate freely without interference. The planet gear 16 has fewer teeth than the ring gear 21. For example, the ratio of planet gear 16 teeth to ring gear 21 teeth is, 55:60. When the hexagonal drive shaft 22 rotates clockwise it results in the body 11 rotating counterclockwise with respect to the gear ratio.

The planetary capsule 20 is activated by advancing the hexagonal drive shaft 22 of the handpiece, so that it pushes the plunger 14 forward into the liquid cup 13. Hydraulic pressure ruptures the second frangible membrane 32 of the liquid cup 13 and releases the liquid 65 into the mixing compartment 50. After activation, hexagonal drive shaft 22 stops advancing, so that the mixing step can occur (FIG. 2 step 4). The hexagonal drive shaft 22 starts to rotate which drives planetary capsule 20 around the ring gear 21 as explained above.

The rotation of the planetary mixing capsule 20 is preferably very fast and causes the powder 66 and liquid 65 components to mix. Centrifugal forces cause the powder 66 and liquid 65 to be dispersed against the inner wall of the mixing compartment 50. The eccentric rotation causes the inner side wall of the capsule body 11 to rotate and the powder/liquid mixture to continuously flow over the side wall to the outer most orientation. In this manner, the paste is continuously sheering over itself and mixing.

The following embodiments refer to FIGS. 16 through 41 and are herein referred to as capsules with internal mixing blades 70. The components of the capsule are described in more detail below. The handpiece 60 has been omitted for clarity except for the functional mechanism that acts upon the capsule to activate, mix and dispense the paste derived from mixing the powder 66 and liquid 65 components.

Figure 18:
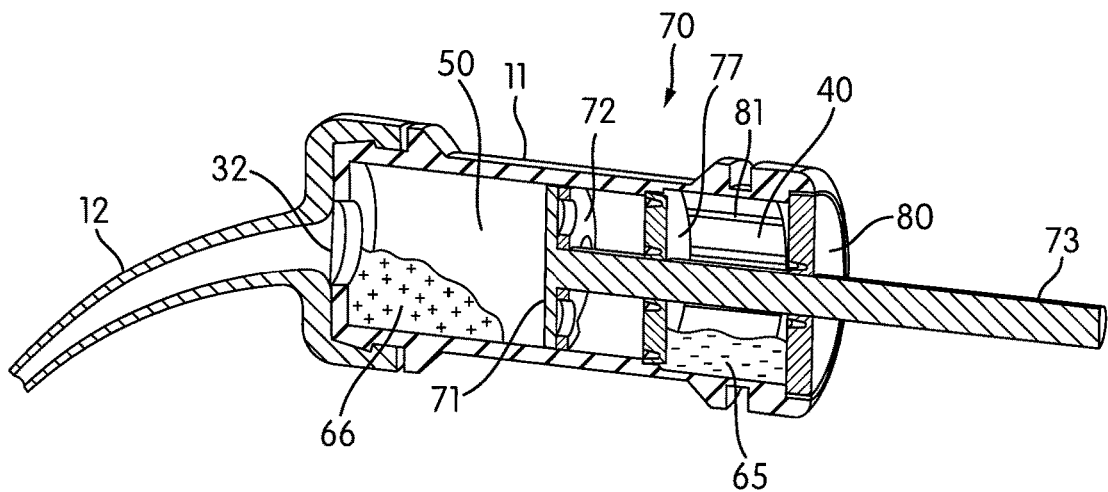
FIG. 18 is an isometric cross section view of the capsule of FIG. 16 in the filled/ready to activate stage.

With respect to FIG. 18, The powder 66 component of the formulation is stored in the distal end of the capsule 70. A pair of perforated mixing discs 71 and 72 are enclosed in the mixing compartment 50. The first, is a primary perforated disc 71, which is securely attached to a capsule drive shaft 73 for means of rotation. The other, is a secondary perforated disc 72 which is loosely attached to the capsule drive shaft 73, so it is free to rotate. The secondary perforated disc 72, preferably has a slight friction fit with the inside wall of the mixing compartment 50, so that when the primary perforated disc 71 rotates, the secondary perforated disc 72 tends to resist rotation and therefore affecting position of one disc with respect to the other.

Figure 22A:
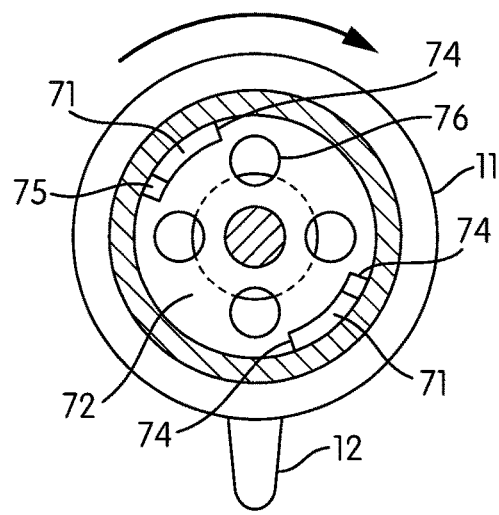
FIG. 22a is an end view cross section illustrating how the holes are aligned by rotating the primary disc clockwise in the capsule of FIG. 21
Figure 22B:
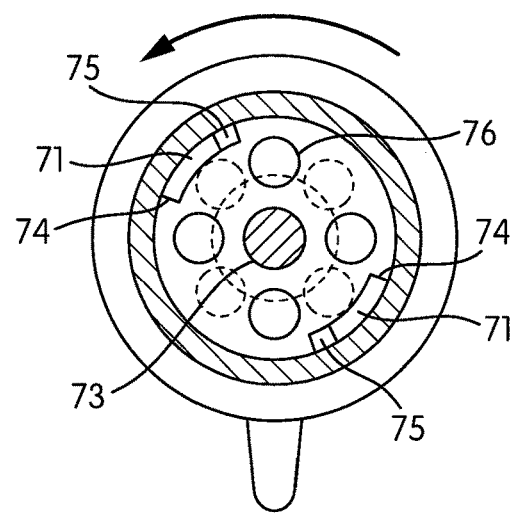
FIG. 22b is an end view cross section illustrating how the holes are closed (misaligned) by rotating the primary disc counter-clockwise in a capsule of FIG. 23.
Figure 23:
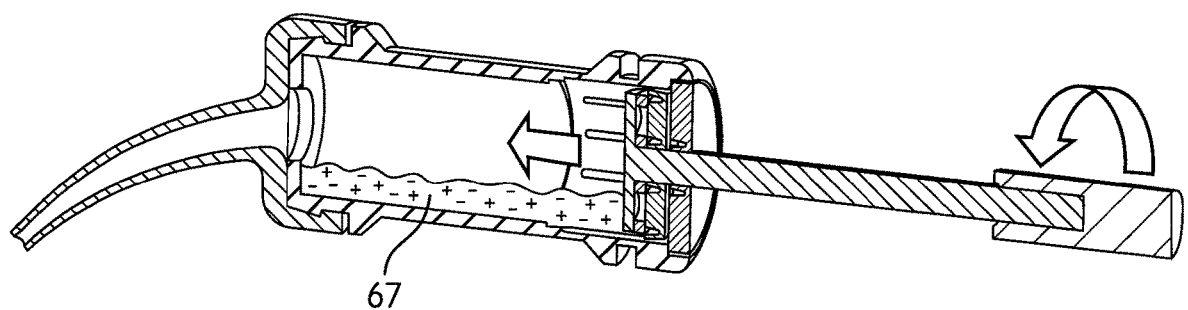
FIG. 23 shows the capsule of Fi. 16 preparing to extrude the mixed paste.
Figure 24:
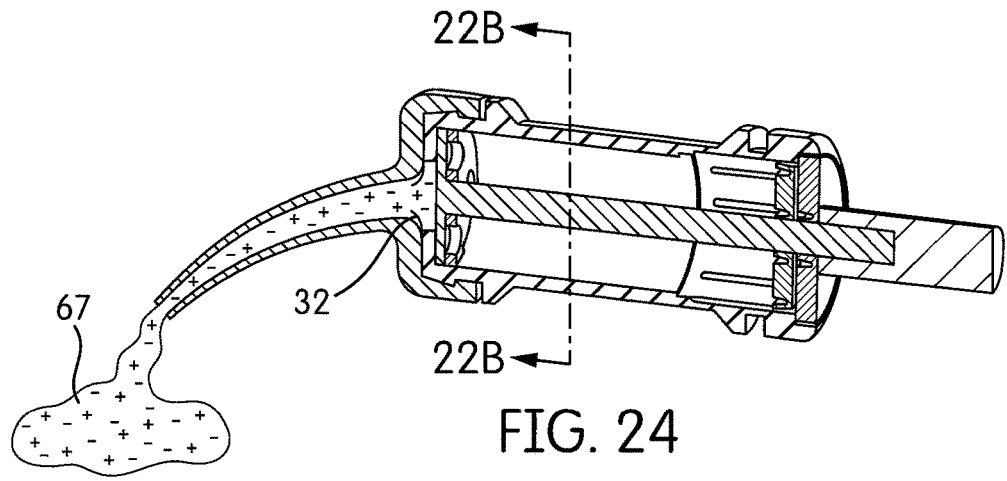
FIG. 24 shows a cross section of a fully extruded capsule of FIG. 16.

The secondary perforated disc 72 has a cut out 74 along the outer edge that mates with a stop block 75, which is securely affixed to the primary perforated disc 71. The cut out 74 and stop block 75 are configured so that when the primary perforated disc 71 is rotated, the perforations 76 either align as in an open position or misalign as in a closed position (FIGS. 22A and 22B). Alignment of the perforations 76 is used for mixing and is achieved for example with a clockwise rotation of the primary disc (FIG. 22A). Misalignment is caused by turning the drive shaft counter-clockwise and is used to close the holes (FIG. 22B) and is used for extruding the mixed paste like a piston.

Figure 20:
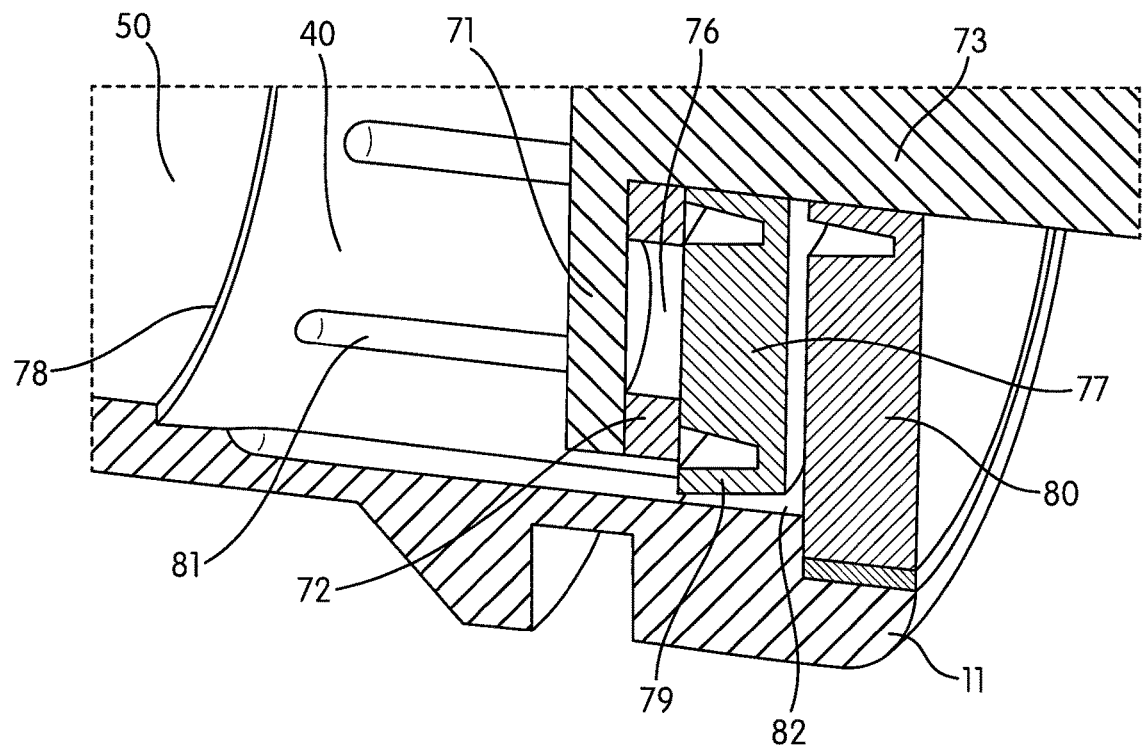
FIG. 20 is a close up section view of the drive shaft of FIG. 16 after it has fully retracted and displaced the liquid seal into the retaining groove.

A liquid sealing disc 77 forms a liquid tight seal between the mixing compartment 50 and the liquid compartment 40 as shown in FIG. 20. The outer most radial edge of the liquid sealing disc 77 has an outwardly biased wiper flange 79, which produces a liquid tight seal with the inside diameter of the liquid compartment 40 and is positioned against a small ledge 78 to prevent forward displacement of the liquid sealing disc 77 into the mixing compartment 50. The liquid sealing disc 70 also has a hole in the middle with a liquid tight seal through which the capsule drive shaft 73 extends towards the proximal end of the capsule.

The liquid compartment 40 is completed by an end cap 80, which is affixed to the proximal end of the capsule body 11. The end cap has a hole in the center for the drive shaft with a liquid tight seal.

Figure 19:
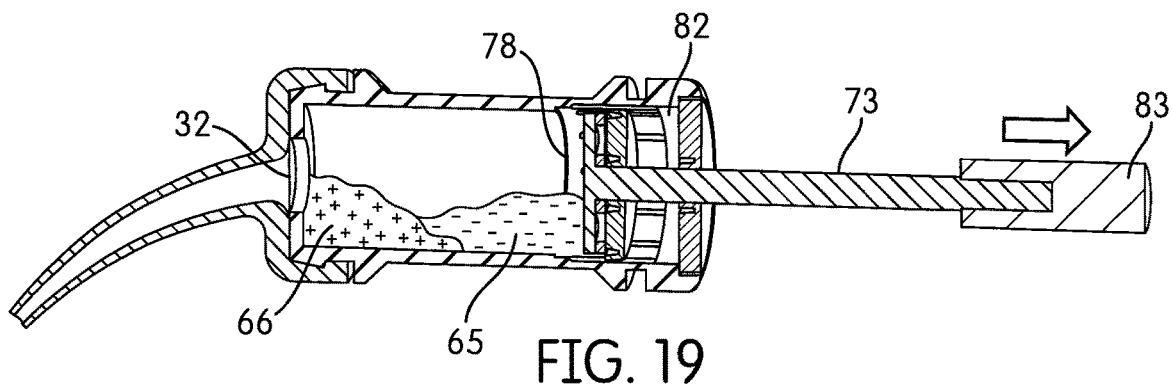
FIG. 19 shows a cross section of the capsule of FIG. 16 as it would be loaded into a handpiece with the drive shaft pulling back the mixing disc to dislodge the liquid plug during activation.

The inner wall of the liquid compartment 40 has at least one channel 81, which may run parallel to the main axis of the capsule body 11 and is positioned a slight distance proximal from the ledge 78. The handpiece 60 has a connector 83 that acts upon the capsule drive shaft 73 to perform the function of activation, mixing and dispensing. The capsule 70 is activated by pulling back on the capsule drive shaft 73 and dislodging the liquid sealing disc 77. When the liquid sealing disc 77 passes the distal starting point of the channel 81 the liquid 65 is displaced into the mixing compartment 50 (FIG. 19). When the capsule drive shaft is pulled all the way back (FIG. 20), the wiper flange 79 of the liquid sealing disc 77 springs outwardly and is captured in a retaining groove 82 near the proximal end of the capsule body 11, preventing any further axial movement of the liquid sealing disc 77.

Figure 21:
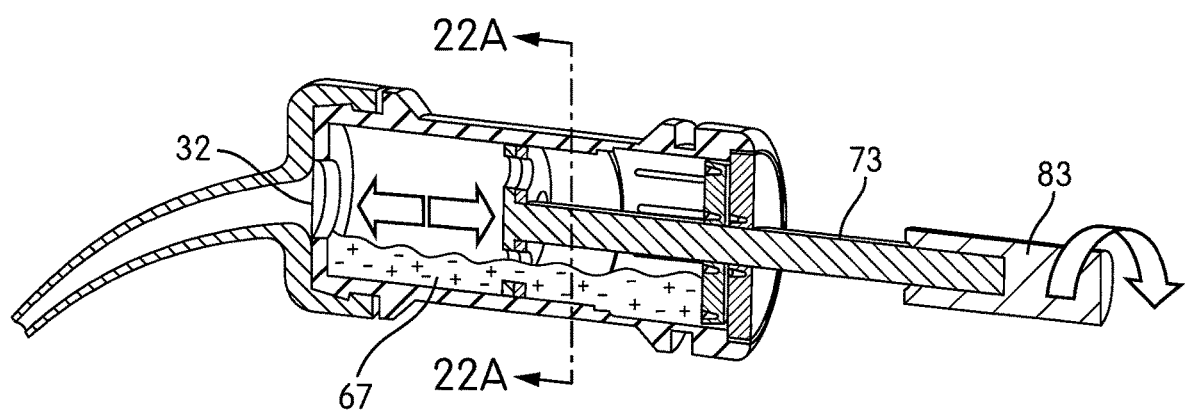
FIG. 21 is an illustration of mixing an activated capsule of FIG. 16.

The capsule drive shaft 73 is then turned for example, clockwise to open the perforations 76 (FIGS. 22A and 22B). Then the capsule drive shaft 73 rotates and reciprocates from a proximal location to a distal location as many times as necessary to mix the paste (FIG. 21). Constant rotation in the same direction that opened the perforations 76 maintains the open state throughout the mixing step. The powder/liquid mixture passes through the open perforations 76 in the perforated discs 71 and 72 and mixes into a paste. Speed of rotation, number of reciprocation cycles and duration of mixing are variable and could be adjusted to the needs of specific paste formulations.

When the paste has been thoroughly mixed, the capsule drive shaft 73 is pulled back by the handpiece connector 83 all the way to the proximal location and rotated for example, counter-clockwise to close the perforations (FIGS. 22A and 22B). The capsule drive shaft 73 is then moved forward using the closed perforated discs 71 and 72 as a piston to dispense the paste through the nozzle 12 FIGS. 23 and 24.

Another embodiment of the primary and secondary perforated discs 71 and 72 is a mixing disc that rotates and reciprocates between a distal position and a proximal position. The disc could be perpendicular to the main axis of the mixing compartment 50 or angled to impart more mixing action. The disc could have perforations that are angled with respect to the face of the disc or angled flaps that allow paste to pass through as it mixes. The disc could then facilitate displacing the paste into the dispensing nozzle like a piston and the flaps could simply collapse against the distal wall of the mixing chamber when acted upon by the cup as a piston.

Figure 29:
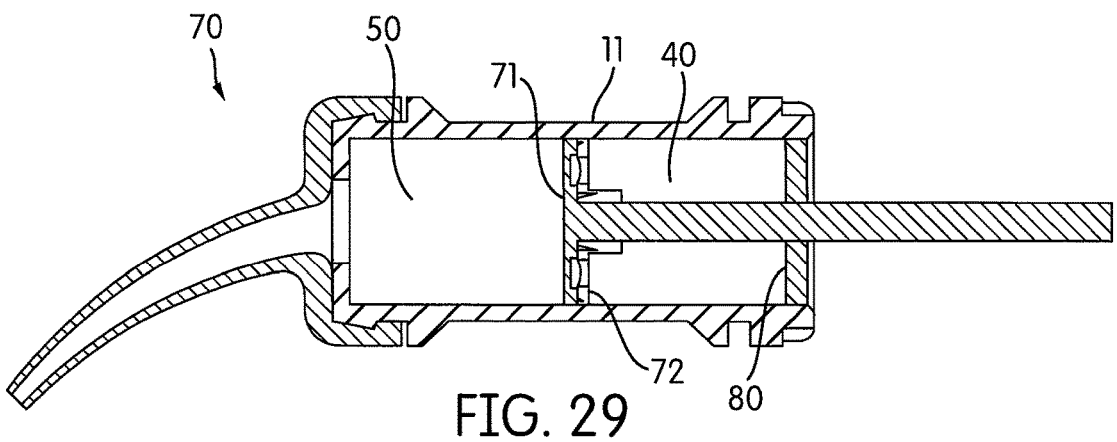
FIG. 29 illustrates an alternative embodiment where the primary and secondary discs effectively seal the liquid and powder in their respective compartments until activated.
Figure 30:
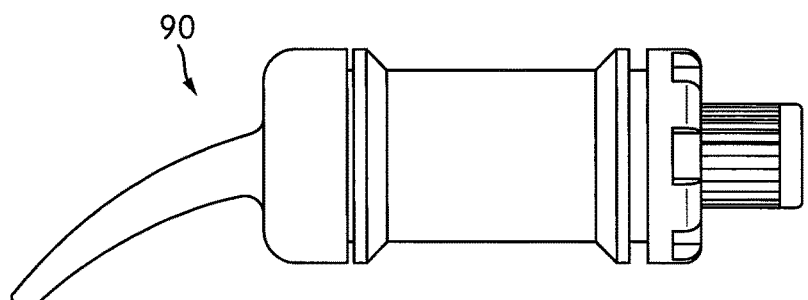
FIG. 30 illustrates a side view of another capsule embodiment in the filled/ready to activate stage, wherein internal mixing blades rotate around the inner wall of the capsule mixing chamber.
Figure 31:
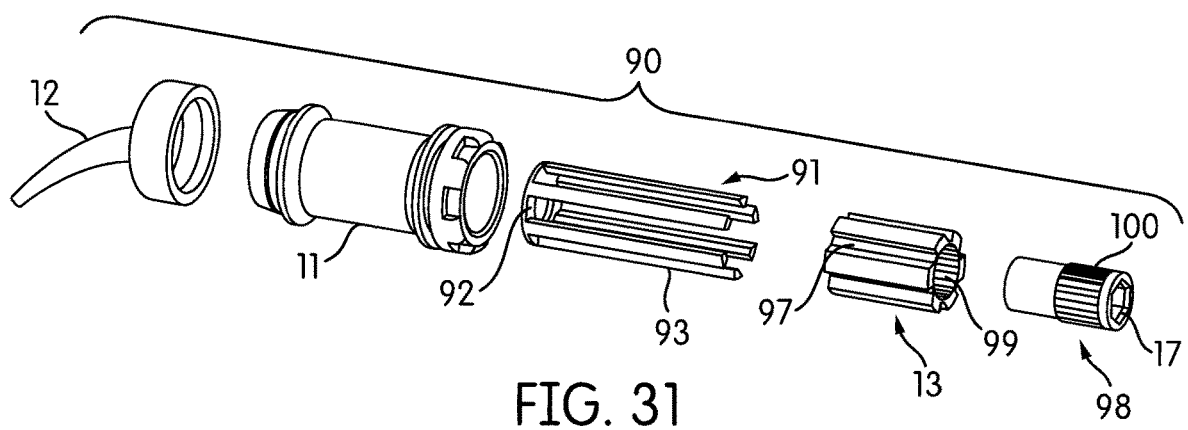
FIG. 31 shows an exploded view of the capsule components of FIG. 30.
Figure 32:
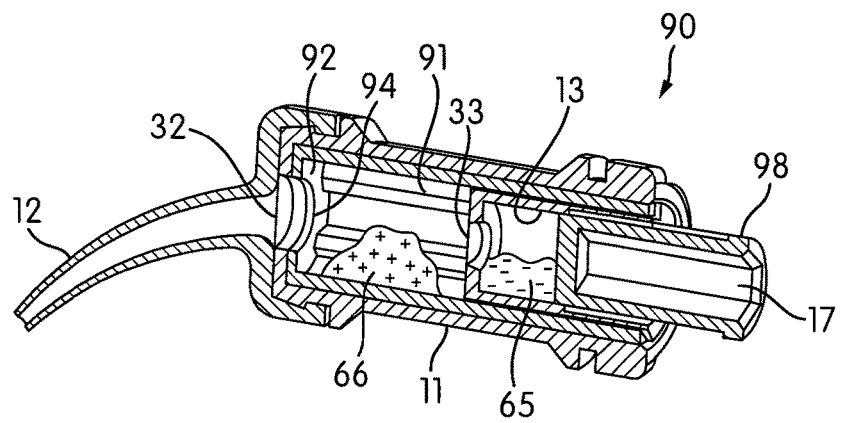
FIG. 32 is an isometric cross section view of the capsule of FIG. 30 in the filled/ready to activate stage.
Figure 33:
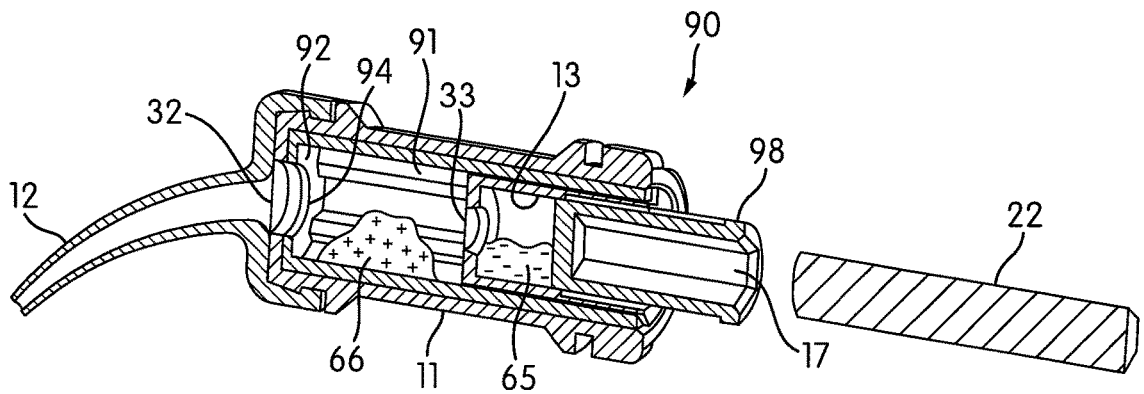
FIG. 33 shows a cross section of the capsule of FIG. 30 as it would be loaded into a handpiece with the hex drive positioned ready to engage the capsule plug.
Figure 34:
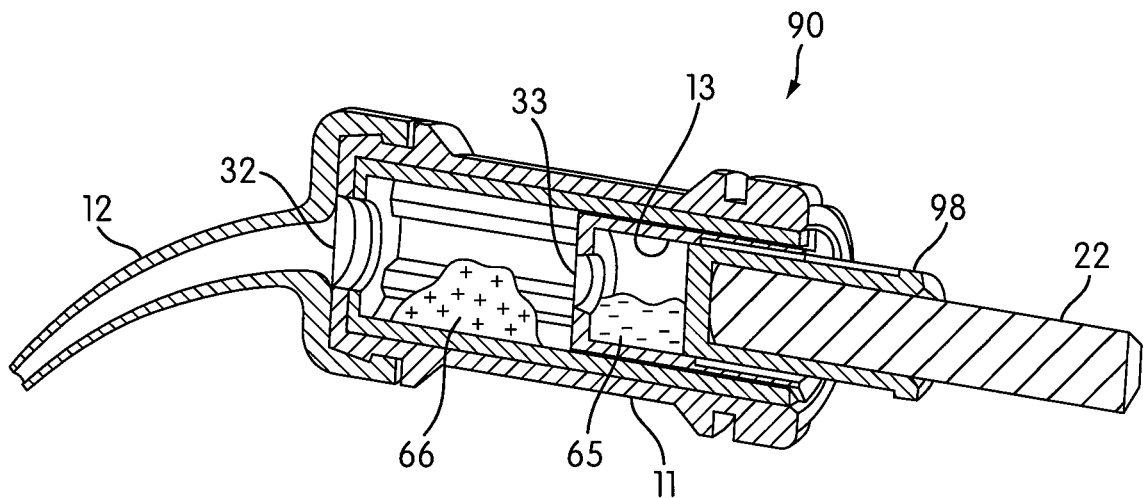
FIG. 34 illustrates the capsule of FIG. 30 after the hex drive has advanced forward and engaged the hex-shaped hole in the plug.
Figure 35:
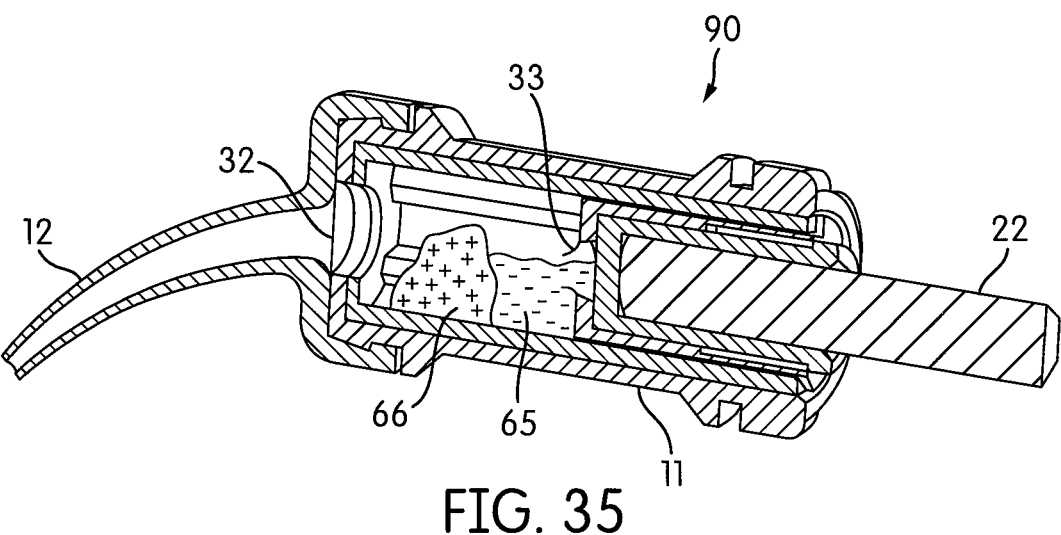
FIG. 35 illustrates an activated capsule of FIG. 30.
Figure 39:
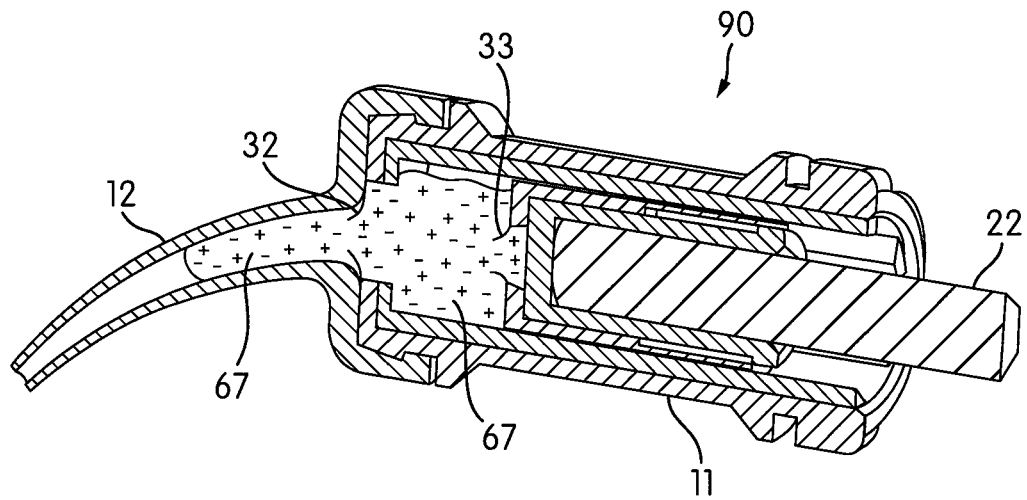
FIG. 39 illustrates the capsule of FIG. 30 dispensing the mixed paste as the hex drive advances, rupturing the frangible membrane.
Figure 40:
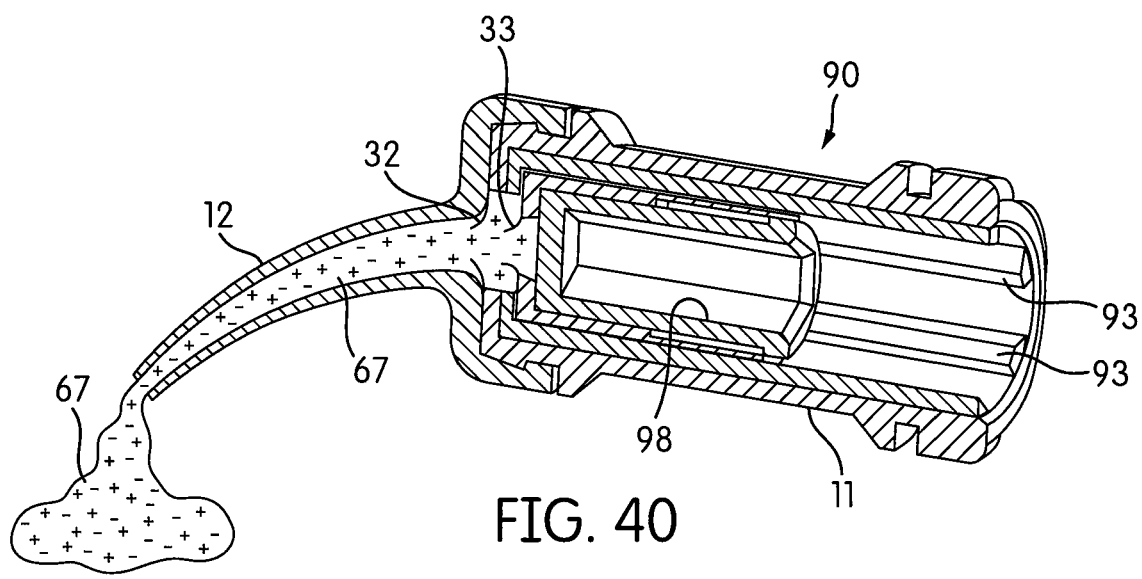
FIG. 40 shows an empty capsule of FIG. 30 with the hex drive withdrawn and dispensed paste.

One embodiment uses the primary perforated disc 71 and secondary perforated disc 72 to separate liquid compartment 40 and mixing compartment 50 as shown in FIG. 29. The discs would create a liquid tight seal between each other when the perforations 76 are in the closed position. A liquid tight seal would also be formed between the secondary perforated disc 72 and capsule drive shaft 73 and the secondary perforated disc 72 and the inside wall of the capsule body 11. Elastomeric seals could be utilized to form an effective liquid tight seal at each perforation 76 in the closed position. Alternatively, an elastomeric disc could be utilized between primary perforated disc 71 and secondary perforated disc 72 to form the required liquid tight seals.

Figure 25:
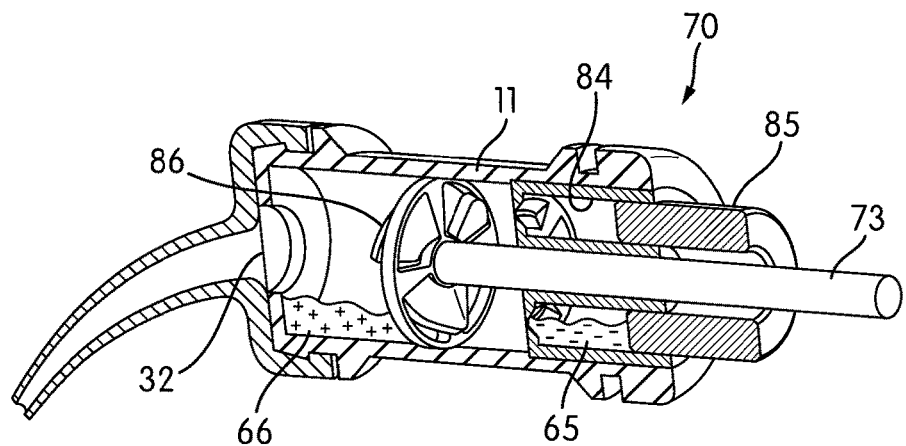
FIG. 25 shows two alternative embodiments for a capsule for internal mixing elements and a donut-shaped liquid cup.
Figure 26:
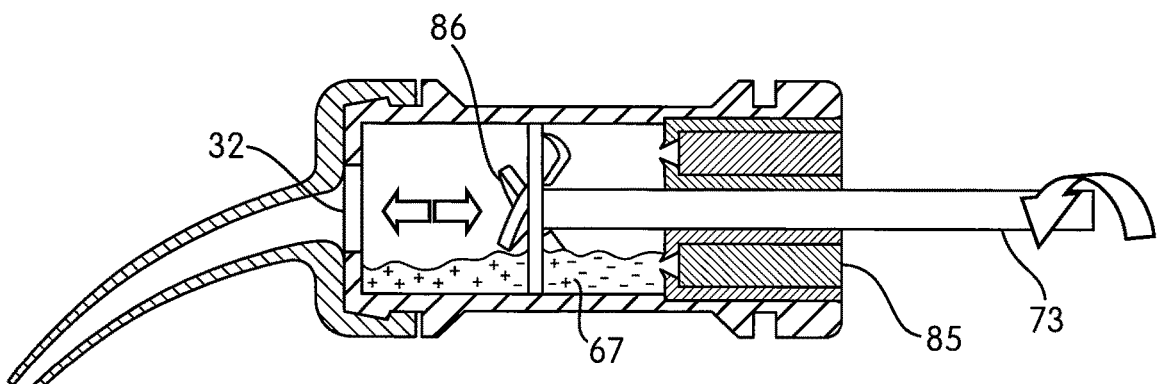
FIG. 26 illustrates the donut-shaped liquid cup of FIG. 25 in the activated stage.
Figure 27:
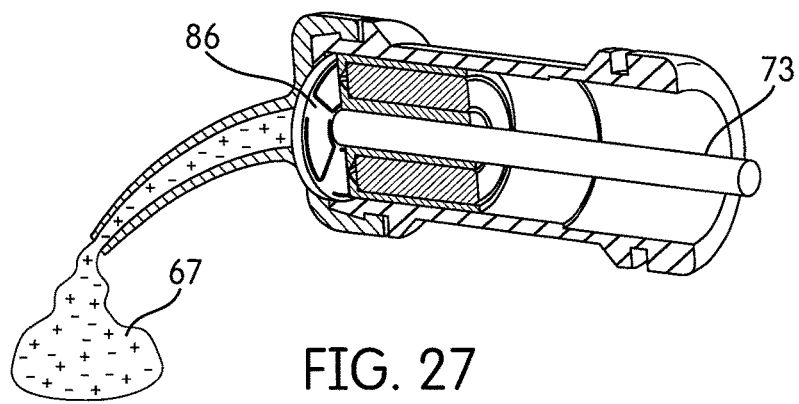
FIG. 27 shows an empty capsule of FIG. 25 with the paste fully dispensed.

An additional embodiment consists of a donut-shaped liquid cup 84 as shown in FIGS. 25, 26 and 27. The donut-shaped liquid cup 84 would consist of a soft plastic such as low-density polyethylene (LDPE) or polypropylene (PP) so that it could form a seal with the inner surface of the capsule body 11. It would have a frangible seal either formed as a contiguous thin section or a heat sealed first frangible membrane 33 at the distal end.

Figure 28:
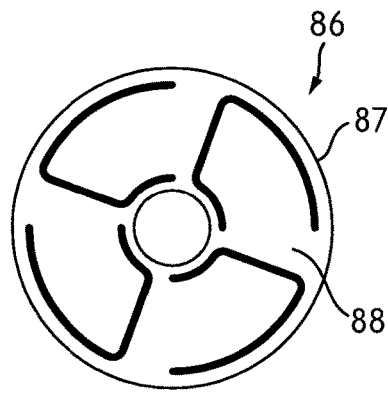
FIG. 28 shows an end view of the collapsed mixing blades of FIG. 27.

Another embodiment consists of a propeller-shaped mixing blade 86 with two or more blades as shown in FIGS. 25 through 28. The blades are supported at the end of a capsule drive shaft 73 which provides the rotational and reciprocating motion for mixing. The outer edge of the blades may be supported by an outer ring 87 that is attached to a radial member 88 that further connects to the capsule drive shaft 73. The blades would collapse into a flat planar orientation during dispensing due to the flexible nature of the plastic used in their manufacture as shown in FIGS. 27 and 28. Such collapsing blades would minimize the dead volume of paste that is retained in the capsule after dispensing.

Another embodiment has the propeller-shaped mixing blades 86 break away from capsule drive shaft 73 to facilitate collapsing. The disc could then facilitate displacing the paste into the dispensing nozzle like a piston and the flaps could simply collapse against the distal wall of the mixing chamber when acted upon by the cup as a piston.

In an additional embodiment, referring to FIGS. 30 through 41 the components of a capsule with rotary mixing blades 90 are described in more detail below.

The body 11 is the main component, which houses the other components and defines the outer geometry which would interface with the handpiece 60 (not shown). the body 11 has a second frangible membrane 32 at the distal end that is either contiguously formed with the body or is a separate heat-sealed foil laminate. The second frangible membrane 32 contains the powder 66 in the mixing compartment 50 and prevents it from getting into nozzle 12 before dispensing.

Figure 41:
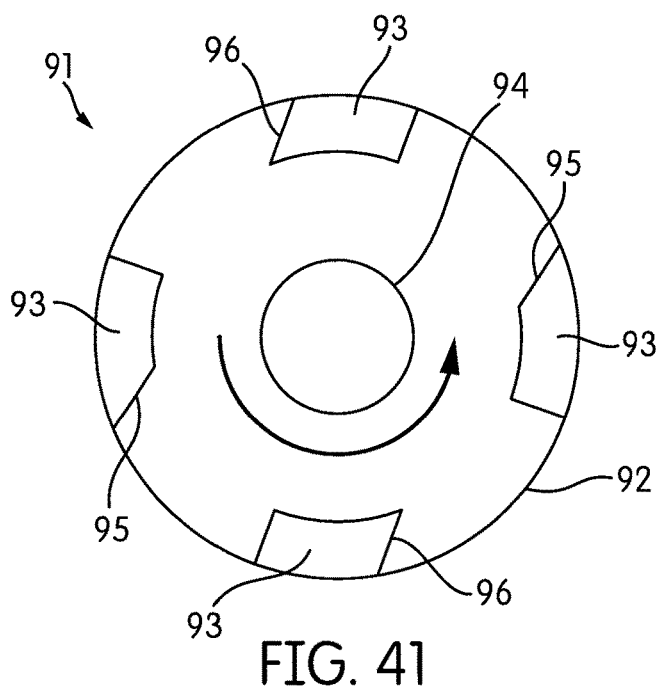
FIG. 41 shows a cross-section of the blades of a capsule of FIG. 30 showing various leading edge configurations of the mixing blades.
Figure 42:
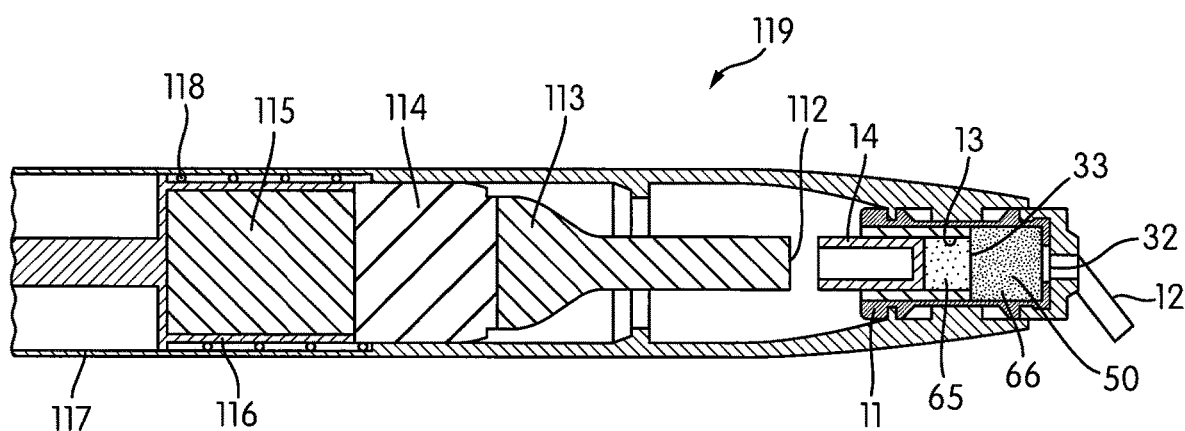
FIG. 42 illustrates the dispenser system of another embodiment prior to capsule activation, wherein the handpiece uses ultrasonic vibration for mixing

As shown in FIG. 41, the rotary mixing blades 91 consists of a round support disc 92 at the distal end that supports radially spaced blades 93. The disc has a passage hole 94 in the middle of support disc 92 to allow the mixed paste 67 to exit the mixing compartment 50 and pass through to nozzle 12. The radially spaced blades 93 may be trapezoidal-shaped with an acute angle edge 95 on one side that scrapes the side of the mixing chamber 50 and an obtuse angle edge 96 on the other side that strops the side of the mixing chamber 50. The alternating scraping and stropping of the powder 66 and liquid 65 causes the paste 67 to mix.

The liquid cup 13 has radially spaced grooves 97 on its outer surface that conform to the profile of the radially spaced blades 93. When the liquid cup 13 rotates it transfers the rotation to the radially spaced blades 93 because the radially spaced blades 93 are captured between the radially spaced grooves 97 and the inner wall of the capsule body 11. When the liquid cup 13 is pushed forward during dispensing, the radially spaced blades 93 slide through the radially spaced grooves 97 to allow the liquid cup 13 to act as a plunger to dispense the mixed paste 67. The liquid cup 13 also has a first frangible membrane 33 that is either contiguously formed with the cup or a separate heat-sealed foil laminate. The inner distal end of the liquid cup 13 is cylindrical and contains the liquid 65 component of the dental material. The cylindrical shape is sealed by the distal end of the plug 98. The inner proximal surface of the liquid cup 13 has first ratchet teeth 99 that mesh with similarly shaped second ratchet teeth 100 on the proximal end of the plug 98 and transfer the rotation of the plug 98 to the liquid cup 13 and radially spaced blades 93.

The plug 98 also has a hexagonal drive hole 17 in the center that is used to engage a hexagonal drive shaft 22 from the handpiece 60.

The nozzle 12 snaps onto the capsule body 11 and transfers the paste 67 from the mixing compartment 50 to the restoration site.

In FIGS. 30 through 41 the handpiece 60 itself, is not shown for clarity, but the hexagonal drive shaft 22 of the handpiece 60 is shown to illustrate the combination of forward and rotational motion necessary to activate, mix and dispense the paste 67. The handpiece 60 would hold the capsule with rotary mixing blades 90 in a stable position to enable the hexagonal drive shaft 22 to interact with said capsule with rotary mixing blades 90.

Another embodiment is where the rotary mixing blades 91 have alternating acute angle edges 95 and obtuse angle edges 96, so that they alternately scrape and strop the paste 67. as shown in FIG. 41. The stropping action with an obtuse angle edge 96 is much like the hand mixing action that a practitioner would use when hand mixing pastes with a spatula. One rotary mixing blade 91 would scrape the paste 67 off the inner wall of mixing compartment 50 and the next would strop it against the wall, resulting in a very efficient mixing action.

Another embodiment has helical rotary mixing blades that mesh with helical grooves on the outside of liquid cup 13. Helical blades would add a directional force to the paste and force the paste to one end of the mixing chamber so that it would not accumulate in the center.

In another embodiment, the following section refers to FIGS. 48 through 53 and describes a method and design for a capsule with liquid storage in the mixing shaft 140.

Described herein is a capsule with liquid storage in the mixing shaft 400 and a handpiece 460. For clarity, only the handpiece drive shaft 415 of the handpiece 460 is shown. The handpiece drive shaft 415 is comprised of an elongated plunger 465 and an extrusion tube 447. The capsule is for storing and mixing powder 411 and liquid 412 components of a mixed dental composition 418. For example, the composition may be a glass ionomer or composite tooth restorative material. The handpiece 460 acts upon the capsule 400 to activate, mix and dispense the mixed dental composition.

The capsule 400 described herein is configured to keep the powder and liquid components separate until needed for application. The powder 411 is stored in a mixing compartment 450 formed by the inside of the capsule body 421. The liquid 412 is stored inside a hollow shaft 413 within the capsule body 421. The liquid 412 is expelled from the hollow shaft 413 during an activation stage and wets the powder 411 in the mixing compartment 450. The hollow shaft 413 is connected to a mixing disc 441. Mixing disc 441 has one or more angled perforations 442 for mixing. As the mixing disc 441 rotates and reciprocates, it mixes the powder 411 and liquid 412 into a paste-like dental composition 418. The dental composition 418 is dispensed from the capsule by extruding the paste through a nozzle 446 at the distal end of the capsule 400. It should be noted by anyone practiced in the art, that the angled perforations 442 may be mixing blades, propeller-like blades, protrusions, ribs, passages holes or the like, to mix said dental composition.

The liquid storage compartment 410 in the hollow shaft 413 has a solid end face 416 at the distal end and an open end 417 at the proximal end. The side wall of the hollow shaft 413 has at least one vent hole 448 near the distal end of the shaft. A first displaceable piston 451 is positioned over the vent hole 448 and seals the end of the hollow shaft 413. The liquid 412 component is filled in through the open end 417 of the hollow shaft 413 and sealed with a second displaceable piston 452 in the proximal end of the hollow shaft 413. The liquid 412 is thereby contained in the liquid storage compartment 410 between the first and second displaceable pistons 451 and 452.

The capsule with liquid storage in the mixing shaft 400 has an internal mixing disc 441 that rotates and reciprocates to mix the dental composition 418. The mixing disc 441 is connected to the distal end of the hollow shaft 413. The axis of the hollow shaft 413 is preferably coincident with the axis of the capsule body 421. The proximal end of the hollow shaft 413 also has bayonet locking tabs 419 which provide a means for connection to the handpiece drive shaft 415 of the handpiece 460. The handpiece drive shaft 415 provides the motion to activate the capsule 400 and rotate and reciprocate the mixing disc 441.

Prior to activation, the mixing disc 441 of the hollow shaft 413 is preferably positioned adjacent to the distal end wall of the capsule's mixing compartment 450. The powder 411 is located in the mixing compartment 450 surrounding the liquid-filled hollow shaft 413. The proximal end of the capsule is sealed with a donut-shaped plunger 444, which also acts as a bearing for the hollow shaft 413. The bearing of the donut-shaped plunger 444 fits frictionally with the outer surface of the hollow shaft 413, so that the hollow shaft 413 can rotate and reciprocate while maintaining a seal to contain the powder 411 and mixed dental composition 418. The donut-shaped plunger 444 also fits frictionally against the inner side wall of the capsule body 421, so that it can be displaced towards the distal end of the capsule to dispense the mixed dental composition 418.

Figure 49:
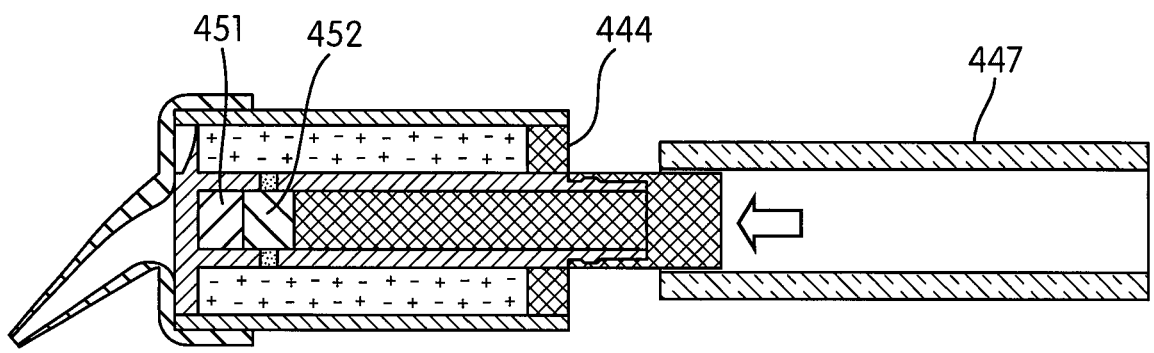
FIG. 49 shows the capsule of FIG. 48 after activation.

The handpiece drive shaft 415 has an elongated plunger 465 that fits within the hollow shaft 413. During activation, the elongated plunger 465 advances and contacts the second displaceable piston 452. The displacement causes the first displaceable piston 451 to move towards the distal end by virtue of hydraulic force because the liquid 412 is uncompressible. When the proximal edge of the first displaceable stopper 451 passes the vent hole 448 the liquid 412 flows out the vent hole 448 and into the mixing compartment 450 that also contains the powder 411. All the liquid 412 will have been displaced into the mixing compartment 450 when the elongated plunger 465 of the drive shaft 415 has displaced the second displaceable piston 452 all the way to the end of the hollow shaft 413 as shown in FIG. 49.

Figure 50:
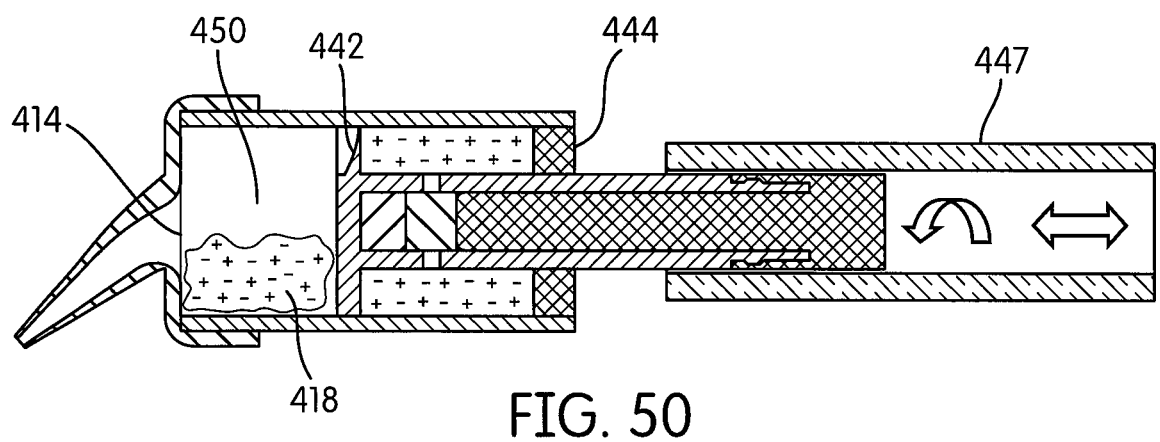
FIG. 50 shows the capsule of FIG. 48 during mixing.

The handpiece drive shaft 415 has a bayonet locking thread 409 on the proximal end of the elongated plunger 465. The proximal end of the hollow shaft 413 has bayonet locking tabs 419. During activation, when the elongated plunger 465 is at the end of the hollow shaft 413 the elongated plunger 465 starts to rotate in a direction that will engage the bayonet locking thread 409 with bayonet locking tabs 419. Once coupled, the elongated plunger 465 starts to rotate and reciprocate back and forth mixing the powder 411 and liquid 412 into a mixed dental composition 418. The direction and continuous rotation ensures the coupling engagement of the bayonet locking features, which remains locked as the mixing disc 441 rotates and reciprocates as shown in FIG. 50

Figure 51:
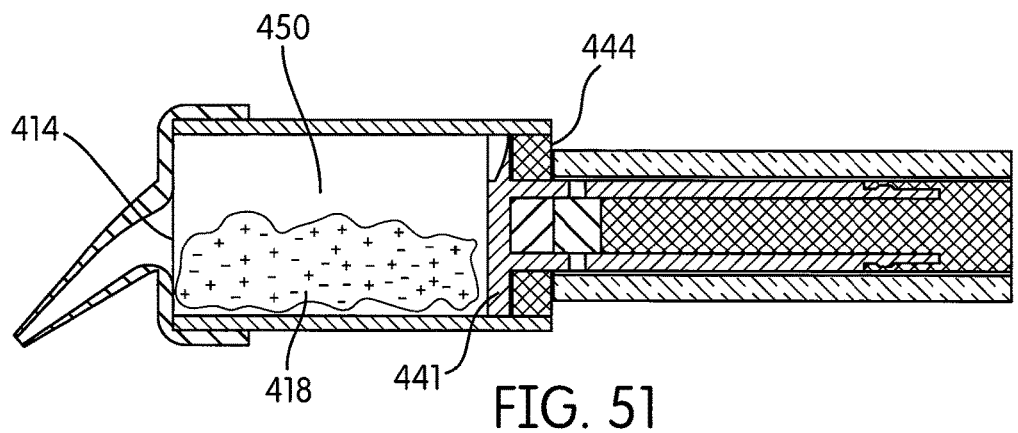
FIG. 51 shows the capsule of FIG. 48 after mixing and prior to extrusion.
Figure 52:
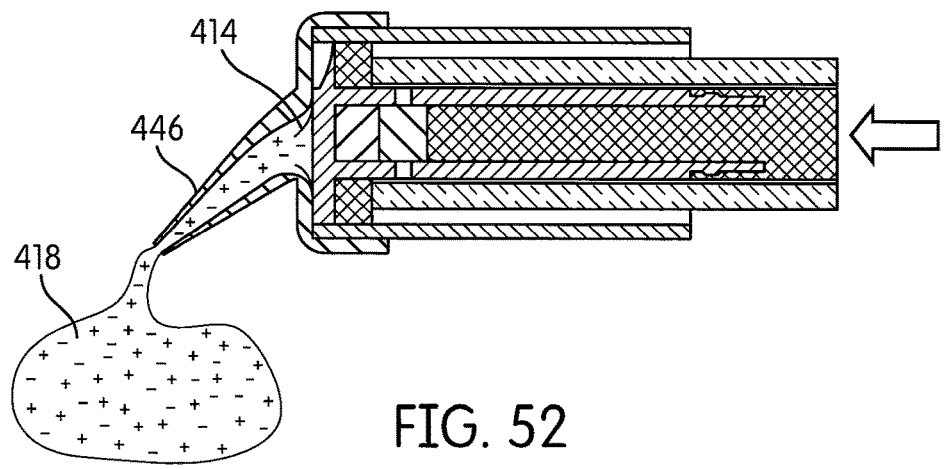
FIG. 52 shows the capsule of FIG. 48 after extrusion of the mixed paste.
Figure 53:
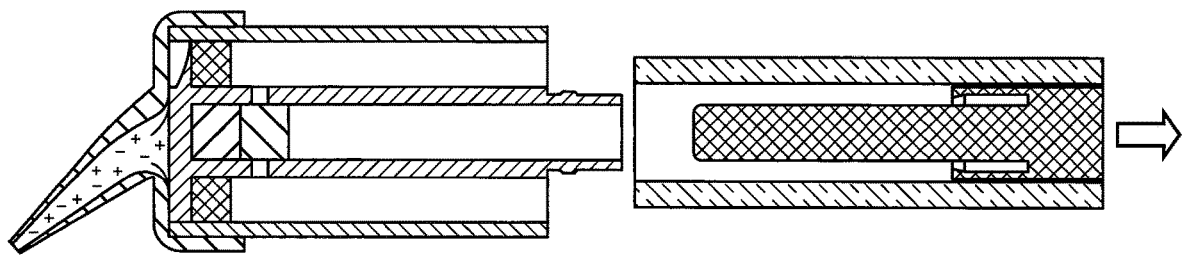
FIG. 53 shows the capsule of FIG. 48 in an empty state with the hand piece drive shaft withdrawn.

When the desired consistency of dental composition 418 is reached and the mixing disc 441 is at the most proximal position as shown in FIG. 51, the extrusion tube 447 advances to push on the donut-shaped plunger 444, expressing the mixed dental composition 418 as shown in FIG. 52. The handpiece drive shaft 415 also advances the mixing disc 441 and hollow shaft 413 as necessary to advance in unison with the donut-shaped plunger 444. Hydraulic force causes frangible membrane 414 to rupture permitting the mixed dental composition 418 to flow from the mixing compartment 450 to the nozzle 446, so that it can be administered to the operative site.

Another embodiment of the capsule with liquid storage in the mixing shaft 400 has collapsible mixing blades that fold flat as described in a previous disclosure and shown in FIGS. 27 and 28.

Another embodiment of the capsule with liquid storage in the mixing shaft 400 distributes the liquid along the length of the liquid storage compartment 410 to distribute the liquid more evenly throughout the mixing compartment 450.

Another embodiment of the capsule with liquid storage in the mixing shaft 400 has a hollow shaft 413 with a hole that goes through the solid end face 416 of mixing disc 441 and a bypass liquid vent on the inner distal section of the hollow shaft 413. The liquid would then be transferred to distal end of the mixing disc 441 rather than the side of the hollow shaft 413.

Described below is an ultrasonic vibration mixing system for capsules as shown in FIGS. 42 to 45. The ultrasonic handpiece 119 and capsule 10 combine together to form a packaging and delivery system that eliminates the need to use a stand-alone amalgamator (a.k.a. triterator) and therefore there is no need to transfer the capsule from an activator, then to an amalgamator and then finally to a manual dispenser. In this new system, the capsule 10 is loaded into the ultrasonic handpiece 119, which activates, mixes and dispenses all from the same delivery device.

It should be noted that only the delivery end of ultrasonic handpiece 119 is shown and described herein, because any number of mechanisms can be utilized to provide the displacement of vibration source 114 and sonotrode 113. Such mechanisms include, but are not limited to, a plunger mechanically advanced by a lever, a pneumatic cylinder, a lead screw and nut, a piezoelectric linear motor, rack and pinion or other such mechanisms that provide linear displacement.

Capsule 10 consists of a body 11, a nozzle 12, a liquid cup 13 and a plunger 14. The liquid cup 13 has a first frangible membrane 33 positioned between liquid cup 13 and mixing compartment 50. Capsule body 11 has a second frangible membrane 32 positioned between mixing compartment 50 and nozzle 12. The powder 66 and liquid 65 are constituents of a mixed dental restorative paste 67 and are contained and isolated in a capsule 10. The liquid 65 is contained in liquid cup 13 and sealed by plunger 14 on the proximal end and the first frangible membrane 33 on the distal end. The powder 66 is contained in the mixing compartment 50 and is sealed by liquid cup 13 and first frangible membrane 33 on the proximal end and second frangible membrane 32 on the distal end. Capsule 10 is preferably detachable from ultrasonic handpiece 119.

Figure 43:
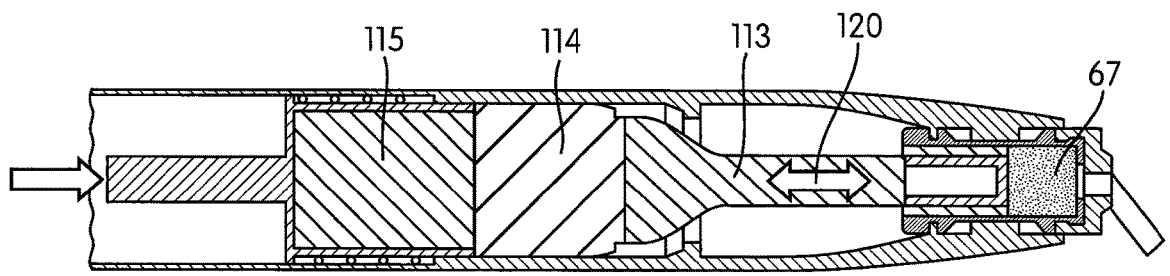
FIG. 43 illustrates the dispenser system of FIG. 42 after capsule activation.

To activate capsule 10, plunger 14 is displaced in an axial direction towards the distal end of liquid cup 13 by the distal end of sonotrode 112. This first-stage displacement causes first frangible membrane 33 of liquid cup 13 to rupture under hydraulic force, which in turn displaces liquid 65 into mixing compartment 50. Vibrations may or may not be used during the activation step. After the liquid 65 is transferred into mixing compartment 50, the axial displacement is paused for mixing. As shown in FIG. 43 vibrations 120 from vibration source 114 are preferably transferred to plunger 14 and capsule body 11 by contact with the distal end of sonotrode 112 to induce mixing of powder 66 and liquid 65 into a paste 67 of mixed dental restorative material. The frequency, duration and amplitude of the vibrations 120 are variable depending on the ratio of powder 66 to liquid 65, the given amounts of material, the desired paste 67 consistency and specific formulation requirements, etc.

The vibration source 114 comprises multiple piezoelectric elements, which are connected at one end to the sonotrode 113 and at the other end to a counterweight 115. The counterweight 115 is surrounded by a sliding sleeve 116. The ultrasonic handpiece 119 comprises the sonotrode 113, vibration source 114, counterweight 115 and sliding sleeve 116, which are all arranged displaceably within the outer body of handpiece 117 of ultrasonic handpiece 119. This displaceable arrangement is referred to as the inner displaceable assembly and is acted upon by an axial force provided by a piston, plunger, linkage, lever or pneumatic cylinder, etc. to displace the sonotrode 113 in relation to stationary capsule 10. The displacement acts in a direction from the proximal end to the distal end of the ultrasonic handpiece 119 and capsule 10.

Figure 44:
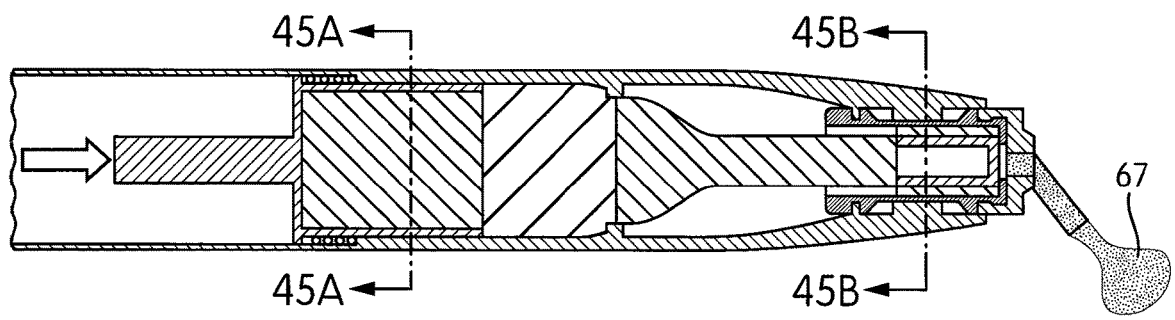
FIG. 44 illustrates the dispenser system of FIG. 42 after paste dispensing.
Figure 45A:
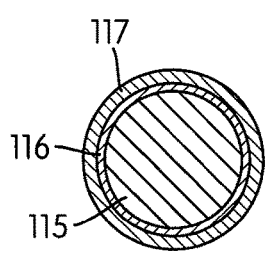
FIG. 45 illustrates cross sectional views of FIG. 44.
Figure 45B:
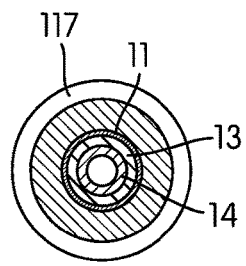

As shown in FIG. 44, after the dental restorative material is thoroughly mixed into a paste 67, the sonotrode 113 is displaced towards the distal end of capsule 10, which displaces plunger 14 and liquid cup 13 towards the distal end of capsule 10. This second stage displacement causes the second frangible membrane 32 to rupture under hydraulic force, which permits the mixed dental restorative material paste 67 to be transferred into nozzle 12 for delivery to the operative site. Vibrations may or may not be used during the dispensing step. Preferably, the second stage displacement can be controlled by the operator in order to control the flow of the paste 67 according to the operator's needs.

Spring 118 biases the inner displaceable assembly towards the proximal end of ultrasonic handpiece 119. During axial displacement of the inner displaceable assembly, spring 118 is compressed. When dispensing is complete the biasing force of spring 118 returns the inner displaceable assembly back to the proximal end of ultrasonic handpiece 119 so that empty capsule 10 may be removed and discarded.

In another embodiment, the sonotrode 113 transfers vibrations directly to the body 11 of the capsule 10 through a direct and secure connection. The connection can be selectively locked and unlocked to disconnect the capsule body 11 from the sonotrode 113 and to facilitate each stage of displacement of the sonotrode 113 during capsule activation and delivery of mixed dental restorative paste 67.

Another embodiment exists wherein the device mixes two fluids or two paste products.

Figure 46:
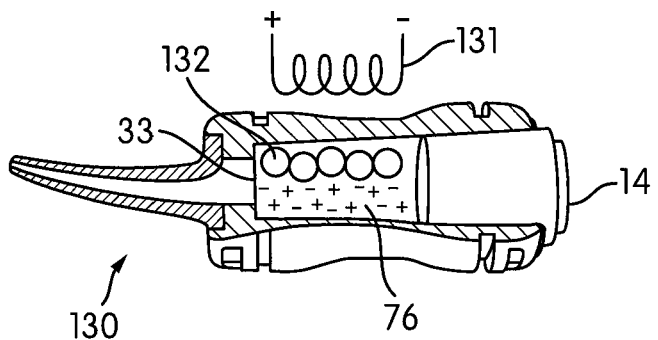
FIG. 46 illustrates another embodiment of dispensing capsule wherein a magnetic field is used to manipulate internal steel balls to mix the paste.
Figure 47:
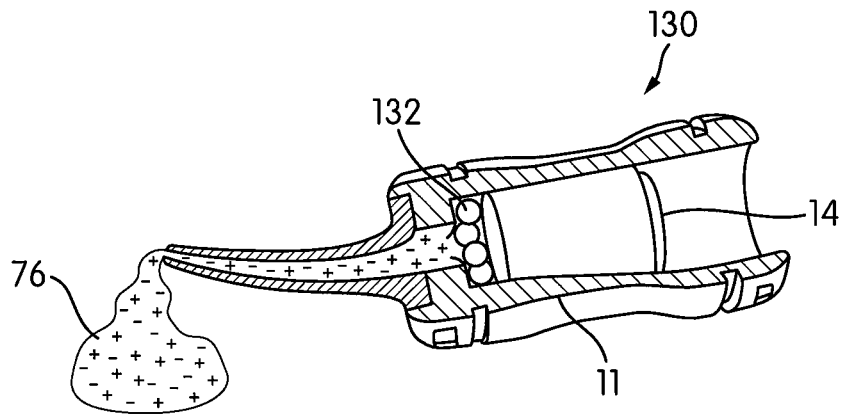
FIG. 47 shows the capsule of FIG. 46 in the fully dispensed state.
Figure 48:
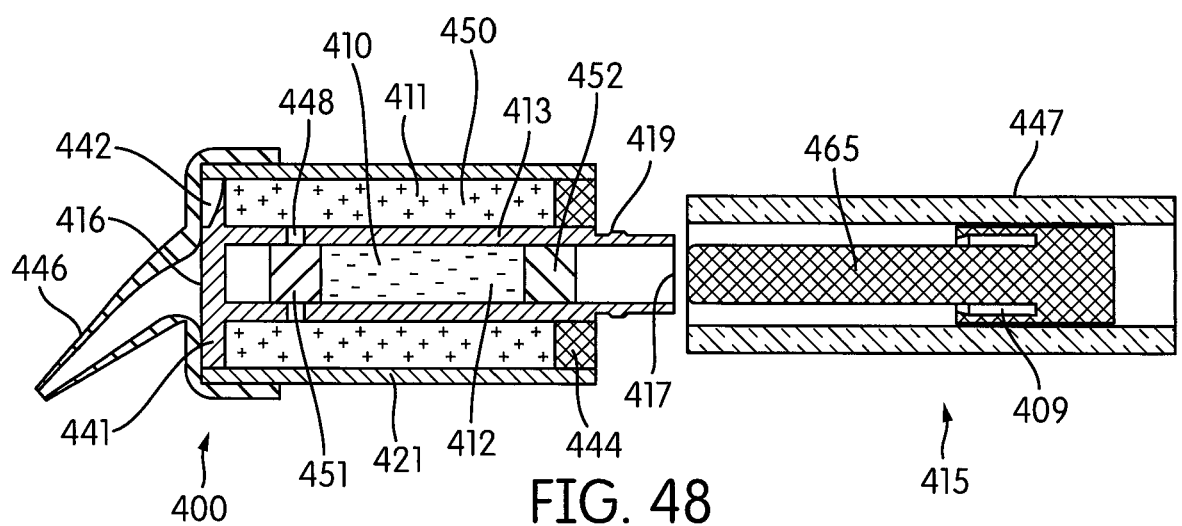
FIG. 48 illustrates another embodiment wherein the liquid component is stored and contained in the mixing shaft that also supports internal mixing blades.

The following embodiments refer to a capsule with loose magnetic mixing elements 130 as shown in FIGS. 46 and 47

Described below is a capsule with loose magnetic mixing elements 130 and an external magnetic field 131. Preferably the loose magnetic elements are ferrous materials that are attracted the magnetic field 131. After the capsule 10 is activated (the liquid 65 is introduced into the powder 66) a magnetic field 113 is introduced to move the loose magnetic mixing elements 132 around and assist in mixing the paste 67. FIG. 46 illustrates a how the loose magnetic mixing elements 132 may be spherical-shaped and are attracted to an external magnetic field 131. The external magnetic field 131 can be moved around the capsule or pulsed on and off in order to provide mixing action to the paste 67. In addition, the capsule with loose magnetic mixing elements 130 can be rotated about its longitudinal axis to induce further mixing action. The combination of rotation and application of magnetic field combine to agitate the loose magnetic mixing elements 132 to mix the product into a paste 67.

After mixing, the magnetic field 131 is removed and the mixed paste 67 is dispensed by pushing on the plunger 14. As the plunger 14 advances, the loose magnetic mixing elements easily move to the front of the capsule 10 due to their spherical shape, where they eventually accumulate as shown in FIG. 47. The paste 67 can easily pass between the loose magnetic mixing elements 132, even if they are tightly packed together.

In another embodiment, the front portion of the capsule is designed to act like a screen. It permits the paste 67 to pass through, but prevents the loose magnetic elements from passing through the nozzle 12. The capsule 10 and loose magnetic mixing elements 132 are designed such that the nozzle 12 and screen passageways cannot become blocked.

The capsule with loose magnetic mixing elements 130 has a unique competitive advantage over other systems. One advantage is that the capsule with loose magnetic mixing elements could also be used in a standard amalgam mixer, because the loose elements would facilitate trituration. Likewise, competitive capsules would not work the new handpiece used for the capsule with loose magnetic mixing elements.

General Embodiments

The applicator system disclosed herein may be part of a dental material application system that can only work together with a specialized capsule to obtain the benefits of the system as a whole. The handpiece cannot be used with other competitive capsules because they do not have the mixing features of the previously described capsules and they are not configured to fit within the working mechanisms of an alternative mixing handpiece described herein.

Some of the mixing capsules disclosed herein may work with traditional amalgam mixers and capsule dispensers, but other capsules cannot work in the handpiece disclosed herein (as explained above). This is a unique benefit because in the case of a handpiece failure, the user can use an amalgam mixer as a backup system, since nearly all dental offices have an amalgam mixer. If the user does not want to purchase the mixing handpiece disclosed herein they can use the capsule with their existing amalgam mixing equipment and it would work just as well as competitive capsules. Therefore, the applicator system described herein provides a competitive advantage to those who want to use the total system but no disadvantage to those who don't.

The applicator system disclosed herein may have powered dispensing capability. Traditionally, paste from cement capsules have been delivered by hand operated dispensing guns, which usually consists of a handle and lever that acts upon a plunger. These dispensing guns provide the mechanical advantage necessary to press the plunger, but they still depend on the operator to provide the force while simultaneously controlling the paste application. The new handpiece and capsule described herein, is powered by energy sources within the handpiece (or supplied by the chair-side resource center). The operator simply pushes a control button to advance the drive shaft and dispense the product. This operation requires less sensory control by the operator because the operator does not have to provide, control and monitor the delivery force at the same time. Yet another benefit is that the handpiece described herein may be pen-shaped which is more ergonomic than the manual capsule applicator shown in FIG. 10, step 3.

The applicator system disclosed herein may combine the functions of capsule activation, mixing and dispensing into one device. Previously, these functions required the use of separate devices and transfer of the capsule between them to accomplish the same goal. This greatly simplifies the complexity of the restorative procedure for the user and allows the practitioner to concentrate more on the patient and the procedure and less on coordinating the preparation of the restorative materials, resulting in better patient care.

The applicator system disclosed herein may use planetary motion, which provides a continuous sheering motion because the walls of the mixing chamber are continuously rotating into a new position and the paste wants to stay to the outside due to centrifugal forces.

The applicator system disclosed herein may use a variety of mixing motions in addition to spinning in only one direction. The handpiece could be programmed to reverse direction and spin in the opposite direction for a back-and-forth rotary motion. By doing so, the components are subjected sheer forces imparted by the inertia of the paste and rapidly changing directions. In the case of the planetary capsule, it is possible to use any combination of rotation from the two drive shafts including rotation from only one, both in the same direction, different speeds from either one and reversing one or the other.

The applicator system disclosed herein may include a "smart" package communication system wherein the capsule has an RFID (radio frequency identification) label that can be decoded by a reader contained in the handpiece which identifies the mixing program to be used for that particular product.

The applicator system disclosed herein may include a vacuum within the handpiece to impart a vacuum to the interior of the capsule with the purpose of reducing porosity in the mixed paste. The vacuum may be powered by the energy available on the chair-side resource center of the dental chair.

The applicator system disclosed herein may incorporate ribs, grooves, or other similar engagement mechanisms in the liquid compartment and/or plunger and/or capsule body to prevent the capsule assembly from slipping due to sudden torque imparted to the capsule by the drive shaft.

The applicator system disclosed herein may include a built-in dispensing nozzle or an add-on (after market) dispensing tip as shown in FIG. 1 for direct delivery of the paste to the restoration site.

The applicator system disclosed herein may include internal ribs in the mixing compartment that promote mixing action by sheering the material over the obstruction. Such ribs could be parallel to the axis of rotation, perpendicular or helical.

The applicator system disclosed herein may include frangible membranes on the liquid compartment and mixing compartment that are made of such materials as integrally molded thin wall sections, heat-sealed poly/foil laminations, etc. Thin molded plastic membranes with frangible channels for directing the fracture zone in a controlled manner. Thicker areas may prevent sections of the frangible membrane from inadvertently becoming dislodged and getting incorporated into the paste. As such, the thickened section acts as a hinge.

The applicator system handpiece disclosed herein may signal the completion of steps or the readiness state of the handpiece through the use of audible tones, messages or LED signal lights may be included in the applicator system disclosed herein. For example, after the product is mixed, the material will have a specific working time in which the operator must dispense it. The handpiece could signal the user with lights, audible tones, prerecorded messages etc. that are specific to the material being used and which guide the user through the dispensing and application of the material. For example, a gauge showing working time decreasing, a prerecorded voice prompt that says "ready to dispense", audible tones that beep at different stages, etc.

The applicator system disclosed herein may include a USB computer connection on the handpiece to download specific function updates or to conduct self-diagnostics over the internet or to update the software programs.

The applicator system disclosed herein may include a pre-programmed pressure relief feature that when paste is being delivered and the user wishes to stop dispensing and stops pressing the apply button, the drive shaft automatically backs up a small amount which is sufficient to relieve pressure and prevent paste from oozing out of the dispensing nozzle.

The applicator system disclosed herein may include a pressure sensing limit capability such as a motor current limit detection which prevents the device from over pressurizing the capsule during activation and dispensing.

The applicator system disclosed herein may include an auto load function where no specific load button is required (as explained above). In this embodiment, the handpiece would sense when a capsule was loaded and the access door was closed, which would automatically advance the drive shaft to engage with the hexagonal hole in the capsule plunger. As such the plunger and drive mechanism would be prepositioned and ready to be activated on command.

The applicator system disclosed herein may include an automatic unload function, where after the material is dispensed and the drive shaft cannot advance any further it retracts and unlocks the handpiece compartment door automatically, so that the empty capsule may be removed.

The applicator system disclosed herein may be capable of utilizing dispensing tips that when applied

We claim:

1. A handpiece comprising a chamber having a capsule therein, comprising:
   the chamber holds the capsule; the capsule having a powder and liquid,
   wherein the capsule has internal mixing elements therein that rotate and reciprocate to mix the powder and liquid;
   wherein the handpiece is capable of being triggered in order for the capsule to be activated such that the powder and the liquid are mixed into a paste,
   wherein the handpiece is capable of dispensing the paste from the capsule,
   wherein the capsule comprises a donut-shaped liquid cup, the donut-shaped liquid cup has an outer circular wall and an inner circular wall such that between the outer circular wall and the outer inner circular wall is a circular space that contains the liquid, the donut-shaped cup has a central bearing through which a mixing shaft and the internal mixing elements are supported such that the central bearing is actuated upon the capsule being activated, and
   wherein the internal mixing elements are perforated disks that rotate and reciprocate back and forth to mix the liquid and the powder together.

2. The handpiece of claim 1, wherein the handpiece further comprises a battery, such that the handpiece is battery powered.

3. The handpiece of claim 1, wherein the capsule further comprises a radio frequency identification emitter such that the capsule is read by a radio frequency reader in the handpiece and the handpiece imparts the proper mixing sequence for a mixture.

4. The handpiece of claim 1, wherein the internal mixing elements are adapted to fold flat against an end wall of the capsule during extrusion.

5. The handpiece of claim 1, wherein pressure is relieved during an intermediate pausing of dispensing by backing up at least one piston in order to reduce oozing of the paste during such the intermediate pause.

6. The handpiece of claim 1, the handpiece further comprising a current limit sensor that reduces a motor speed of the handpiece, thereby reducing a dispensing rate of the paste being dispensed.

7. The handpiece of claim 1, wherein the handpiece further comprises at least one plunger, and the at least one plunger is retracted so that the chamber is unlocked after all the paste has been dispensed so that the capsule can be removed from the chamber.

8. The handpiece of claim 1, wherein the capsule further comprises two disks that rotate relative to one another to open and close holes that when in the open position are for mixing the paste and when in the closed position facilitate the paste extrusion.

9. The handpiece of claim 1, wherein the handpiece is powered by air, water, or electrical services of the delivery unit of a dental chair.

* * * * *